United States Patent
Mitsui et al.

(10) Patent No.: US 11,959,010 B2
(45) Date of Patent: Apr. 16, 2024

(54) HEAT STORAGE COMPOSITION, HEAT STORAGE MEMBER, ELECTRONIC DEVICE, AND MANUFACTURING METHOD OF HEAT STORAGE MEMBER

(71) Applicant: FUJIFILM Corporation, Tokyo (JP)

(72) Inventors: Tetsuro Mitsui, Shizuoka (JP); Naotoshi Sato, Shizuoka (JP); Aya Nakayama, Shizuoka (JP); Takuto Matsushita, Shizuoka (JP); Masahiro Hatta, Shizuoka (JP); Hiroshi Kawakami, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 17/477,558

(22) Filed: Sep. 17, 2021

(65) Prior Publication Data

US 2022/0002605 A1   Jan. 6, 2022

Related U.S. Application Data

(63) Continuation of application No. PCT/JP2020/012248, filed on Mar. 19, 2020.

(30) Foreign Application Priority Data

Mar. 25, 2019 (JP) ................ 2019-057347
Sep. 2, 2019 (JP) ................ 2019-159485
Feb. 28, 2020 (JP) ................ 2020-032961

(51) Int. Cl.
*C09K 5/06* (2006.01)
*C09K 21/04* (2006.01)
*F28D 20/02* (2006.01)

(52) U.S. Cl.
CPC .............. *C09K 5/063* (2013.01); *C09K 21/04* (2013.01); *F28D 20/02* (2013.01)

(58) Field of Classification Search
CPC .......... C09K 5/063; C09K 21/04; F28D 20/02
USPC ......................................... 165/10
See application file for complete search history.

(56) References Cited

U.S. PATENT DOCUMENTS

| | | | |
|---|---|---|---|
| 8,045,846 B2 | 10/2011 | Amano | |
| 8,957,122 B2 | 2/2015 | Altmann et al. | |
| 10,097,025 B2 | 10/2018 | Yajima et al. | |
| 10,447,059 B2 | 10/2019 | Yajima et al. | |
| 10,734,829 B2 | 8/2020 | Yajima et al. | |
| 10,968,379 B2 | 4/2021 | Koseki et al. | |
| 2005/0106392 A1 | 5/2005 | Sano et al. | |
| 2009/0199994 A1* | 8/2009 | Amano | F28D 20/023 165/10 |
| 2011/0121246 A1 | 5/2011 | Biggin et al. | |
| 2012/0266553 A1 | 10/2012 | Shiao et al. | |
| 2016/0024364 A1* | 1/2016 | Yoshinari | C09K 5/066 252/75 |
| 2022/0135773 A1* | 5/2022 | Schlosser | C09K 21/12 174/70 C |

FOREIGN PATENT DOCUMENTS

| | | |
|---|---|---|
| CN | 1643104 | 7/2005 |
| CN | 1927985 | 3/2007 |
| CN | 101107340 | 1/2008 |
| CN | 101397489 | 4/2009 |
| CN | 102408877 | 4/2012 |
| CN | 103228710 | 7/2013 |
| CN | 104896773 | 9/2015 |
| CN | 105393651 | 3/2016 |
| CN | 107057648 | 8/2017 |
| CN | 108603097 | 9/2018 |
| CN | 108893096 | 11/2018 |
| CN | 109071959 | 12/2018 |
| CN | 109504350 | 3/2019 |
| EP | 3412746 | 12/2018 |
| JP | H0641522 | 2/1994 |
| JP | H0649441 | 2/1994 |
| JP | 2011502927 | 1/2011 |
| JP | 5192138 | 5/2013 |
| JP | 2014082412 | 5/2014 |
| JP | 2018076485 | 5/2018 |
| KR | 20180050445 | 5/2018 |
| TW | 200934860 | 8/2009 |
| WO | 2012147677 | 11/2012 |

OTHER PUBLICATIONS

"International Search Report (Form PCT/ISA/210) of PCT/JP2020/012248," dated Jun. 16, 2020, with English translation thereof, pp. 1-6.
"Written Opinion of the International Searching Authority (Form PCT/ISA/237)" of PCT/JP2020/012248, dated Jun. 16, 2020, with English translation thereof, pp. 1-7.
Office Action of China Counterpart Application, with English translation thereof, dated Dec. 31, 2021, pp. 1-14.
Liao ning Scientific, "Liao ning Products Go" with English concise explanation, Liao ning Province Petrochemical Industiy Hall, Dec. 1994, pp. 1-6.
"Office Action of China Counterpart Application" with English translation thereof, dated Jun. 28, 2022, p. 1-p. 9.
"Decision of Refusal of China Counterpart Application" with English translation thereof, dated Sep. 8, 2022, p. 1-p. 10.
"Office Action of Taiwan Counterpart Application", dated Aug. 22, 2023, with partial of English translation thereof, p. 1-p. 14.

\* cited by examiner

*Primary Examiner* — Joel M Attey
(74) *Attorney, Agent, or Firm* — JCIPRNET

(57) ABSTRACT

An object of the present invention is to provide a heat storage composition excellent in slow flame retardance and a heat storage member excellent in the slow flame retardance. Another object of the present invention is to provide an electronic device including a heat storage member, and a manufacturing method of a heat storage member.
The heat storage composition according to an embodiment of the present invention contains a heat storage material and a flame retardant, in which a specific condition A is satisfied. The heat storage member according to an embodiment of the present invention contains a heat storage material and a flame retardant, in which a specific condition C is satisfied.

21 Claims, No Drawings

HEAT STORAGE COMPOSITION, HEAT STORAGE MEMBER, ELECTRONIC DEVICE, AND MANUFACTURING METHOD OF HEAT STORAGE MEMBER

CROSS-REFERENCE TO RELATED APPLICATIONS

This application is a Continuation of PCT International Application No. PCT/JP2020/012248 filed on Mar. 19, 2020, which claims priority under 35 U.S.C. § 119(a) to Japanese Patent Application No. 2019-057347 filed on Mar. 25, 2019, Japanese Patent Application No. 2019-159485 filed on Sep. 2, 2019, and Japanese Patent Application No. 2020-032961 filed on Feb. 28, 2020. Each of the above applications is hereby expressly incorporated by reference, in its entirety, into the present application.

BACKGROUND OF THE INVENTION

1. Field of the Invention

The present invention relates to a heat storage composition, a heat storage member, an electronic device, and a manufacturing method of a heat storage member.

2. Description of the Related Art

In equipment such as an electronic device, a building, an automobile, and an exhaust heat utilization system, a heat storage member that stores heat from a heat generating body and suppresses the overall temperature rise is used. The heat storage member includes a heat storage material that functions as a material that can store heat generated outside a heat storage layer.

For example, JP5192138B discloses a heat storage acrylic resin composition including, as matrices each having a specific content, (A) an acrylic copolymer having a reactive functional group and a specific molecular weight, (B) a compound having a functional group that reacts with an acrylic copolymer to extend the chain, and (C) an acrylic copolymer having no reactive functional group in a molecular chain and having a specific molecular weight, and a sheet-shaped molded body obtained by molding the heat storage acrylic resin composition into a sheet shape and curing the molded heat storage acrylic resin composition (see claims 1 and 4).

SUMMARY OF THE INVENTION

Since an existing heat storage member as disclosed in JP5192138B includes a combustible material such as paraffin as a heat storage material, in some cases, a flame retardant may be further contained for the purpose of improving flame retardance.

Examples of a method of suppressing combustion of a heat storage composition containing the heat storage material, a heat storage sheet, and a heat storage member (in the present specification, these are also collectively referred to as a "heat storage matter") include two methods of improvement of ignition resistance to suppress ignition of the heat storage matter, and improvement of a slow flame retardance (combustion delay property) to suppress expansion of a combustion range of the heat storage matter. The present inventors further examined the flame retardance of heat storage matters containing the existing flame retardant from the above viewpoint, and found that there is room for further improvement in the slow flame retardance of these heat storage matters.

The present invention has been made in view of the above circumstances. The present invention is to provide a heat storage composition excellent in slow flame retardance and a heat storage member excellent in the slow flame retardance.

Further, the present invention is to provide an electronic device including a heat storage member, and a manufacturing method of a heat storage member.

Specific means for solving the objects of the present invention include the aspects as follows.

[1]
A heat storage composition comprising a heat storage material, and a flame retardant, in which Condition A is satisfied.

[2]
The heat storage composition according to [1], in which the heat storage material contains paraffin.

[3]
The heat storage composition according to [1] or [2], in which a content of the heat storage material to the total mass of the heat storage composition is 70% by mass or more.

[4]
The heat storage composition according to any one of [1] to [3], in which the content of the flame retardant to a content of the heat storage material is 0.1% by mass or more.

[5]
The heat storage composition according to any one of [1] to [4], in which the flame retardant contains at least one selected from the group consisting of diammonium hydrogen phosphate, ammonium dihydrogen phosphate, and trimethyl phosphate.

[6]
The heat storage composition according to any one of [1] to [5], in which the flame retardant contains at least one selected from the group consisting of diammonium hydrogen phosphate and ammonium dihydrogen phosphate.

[7]
The heat storage composition according to any one of [1] to [6], in which the gas generation temperature Tr of the flame retardant is 100° C. or higher.

[8]
The heat storage composition according to any one of [1] to [7], in which the heat storage composition is sheet-shaped.

[9]
A heat storage member comprising a heat storage material, and a flame retardant, in which Condition C is satisfied.

[10]
The heat storage member according to [9], in which the heat storage member has a heat storage layer, which includes the heat storage material, and a protective layer, and at least one of the heat storage layer or the protective layer contains the flame retardant.

[11]
The heat storage member according to [9] or [10], in which the heat storage material contains paraffin.

[12]
The heat storage member according to any one of [9] to [11], in which a content of the heat storage material to the total mass of the heat storage member is 70% by mass or more.

[13]

The heat storage member according to any one of [9] to [12], in which the content of the flame retardant to a content of the heat storage material is 0.1% by mass or more.

[14]

The heat storage member according to any one of [9] to [13], in which the flame retardant contains at least one selected from the group consisting of diammonium hydrogen phosphate, ammonium dihydrogen phosphate, and trimethyl phosphate.

[15]

The heat storage member according to any one of [9] to [14], in which the flame retardant contains at least one selected from the group consisting of diammonium hydrogen phosphate and ammonium dihydrogen phosphate.

[16]

The heat storage member according to any one of [9] to [15], in which the gas generation temperature Tr of the flame retardant is 100° C. or higher.

[17]

The heat storage member according to [10], in which the protective layer contains the flame retardant.

[18]

The heat storage member according to [10] or [17], in which the protective layer has a crosslinking structure.

[19]

The heat storage member according to any one of [10], [17], and [18], in which the protective layer has a thickness of 10 μm or less.

[20]

An electronic device comprising at least one selected from the group consisting of the heat storage composition according to any one of [1] to [8] and the heat storage member according to any one of [9] to [19].

[21]

A manufacturing method of the heat storage member according to any one of [10] and [17] to [19], the method comprising disposing the protective layer on at least one surface of the heat storage layer.

According to the present invention, it is possible to provide the heat storage composition excellent in the slow flame retardance, the heat storage sheet excellent in the slow flame retardance, and the heat storage member excellent in the slow flame retardance. Further, according to the present invention, it is possible to provide the electronic device including the heat storage member and the manufacturing method of the heat storage member.

DESCRIPTION OF THE PREFERRED EMBODIMENTS

Hereinafter, the present invention will be described in detail.

Note that the description of the configuration elements according to the embodiment of the present invention is based on the typical embodiment according to the present invention, but the present invention is not limited to such embodiments.

In the present specification, the numerical range represented by "to" denotes a range including numerical values described before and after "to" as a minimum value and a maximum value, respectively. In the numerical range described stepwise in the present specification, an upper limit value or a lower limit value described in a certain numerical range may be replaced with an upper limit value or a lower limit value of another numerical range described stepwise. Further, in the numerical range described in the present specification, the upper limit value or the lower limit value described in a certain numerical range may be replaced with a value shown in Examples.

In the numerical range described stepwise in the present specification, an upper limit value or a lower limit value described in one numerical range may be replaced with an upper limit value or a lower limit value of another numerical range described stepwise. Further, in the numerical range described in the present specification, the upper limit value or the lower limit value in the numerical range may be replaced with a value shown in Examples.

In the present specification, "% by mass" and "% by weight" are synonymous, and "parts by mass" and "parts by weight" are synonymous.

In the present specification, a combination of two or more preferred embodiments is a more preferred embodiment.

In the present specification, an amount of each component in a composition or a layer is a total amount of a plurality of substances present in the composition unless otherwise noted, in a case in which the plurality of substances corresponding to each component are present in the composition.

A heat storage composition according to the embodiment of the present invention contains a heat storage material and a flame retardant, in which Condition A is satisfied in which a gas generation temperature Tr of the flame retardant obtained by Measuring Method A1 is lower than a gas generation temperature Ta of a specific composition (which will be described below) obtained by Measuring Method A2.

A heat storage member according to the embodiment of the present invention contains a heat storage material and a flame retardant, in which Condition C is satisfied in which a gas generation temperature Tr of the flame retardant obtained by Measuring Method C1 is lower than a gas generation temperature Tc of a specific member (which will be described below) obtained by Measuring Method C2.

In the present specification, Condition A and Condition C, which are described above, are collectively referred to as a "specific condition".

Although the detailed mechanism by which the effect of the present invention is obtained by the heat storage matter in which the specific condition described above is satisfied is not clear, the present inventors presume that a slow flame retardance of the heat storage matter is improved due to the following reasons.

As a typical process of combustion accompanied by flame, there is a process in which (a) a heat generating body (for example, flame) approaches and the temperature of the material rises, (b) a combustible gas (radical) is generated from the material of which the temperature rises, (c) oxygen in the air reacts with the combustible gas and ignites, (d) the temperature of the material is maintained due to (c), and (a), (b), and (c) are repeated. On the other hand, it is presumed that, in the heat storage matter according to the embodiment of the present invention containing the flame retardant, in which the above specific condition is satisfied, the flame retardant decomposes to generate a flame extinguishing gas at a temperature lower than the temperature at which the process (b) in which the heat storage material decomposes to generate the combustible gas and flame extinguishing gas reacts (extinguishes) with the combustible gas generated by the decomposition of the heat storage material to suppress the expansion of a combustion range in the heat storage matter.

Hereinafter, each of the heat storage composition according to the embodiment of the present invention, a heat storage sheet according to the embodiment of the present invention, and the heat storage member according to the embodiment of the present invention will be described in detail.

[Heat Storage Composition]

The heat storage composition according to the embodiment of the present invention satisfies Condition A in which the gas generation temperature Tr of the flame retardant obtained by Measuring Method A1 is lower than the gas generation temperature Ta of the specific composition obtained by Measuring Method A2.

Here, the "specific composition" refers to a composition obtained by removing the flame retardant and a solvent, which has a boiling point of 100° C. or lower, (hereinafter, also referred to as a "specific solvent") from the heat storage composition.

[Condition A]

<Measuring Method A1>

Measuring Method A1 of obtaining the gas generation temperature Tr of the flame retardant is as follows.

A type and a content of the flame retardant contained in the heat storage composition are identified.

As the identifying method, a known method need only be used for identification depending on the types of the flame retardant and the components other than the flame retardant contained in the heat storage composition, and the identification method is not particularly limited. Examples of the identification method include a method in which the heat storage composition is immersed in the solvent (for example, an organic solvent) to extract the heat storage material, and then measured by chromatography, nuclear magnetic resonance (NMR), or infrared spectroscopy (IR), and a method in which, in a case in which the heat storage composition is film-shaped, a cross section of the film cut oblique to a thickness direction is measured by secondary ion mass spectrometry (SIMS) to identify elements, constituent molecules and/or ions which form the film.

Next, a weight change of the identified flame retardant due to heating is measured by using a thermogravimeter-differential thermal analyzer (TG-DTA).

The weight changes of the flame retardant, the specific solvent, which will be described below, and the heat storage matter, which will be described below, due to heating need only be measured by using a known TG-DTA, for example, can be measured under a nitrogen atmosphere and a temperature rising condition of 10° C. per minute.

A relational expression, which is represented by Expression (A1), between a temperature T (° C.) and a weight reduction ratio $\Delta ma(T)$ of the flame retardant is derived based on the obtained measurement result.

$$\Delta ma(T)=(ma_0-ma(T))/(ma_0) \quad (A1)$$

In Expression (A1), ma(T) represents a weight of the flame retardant at the temperature T (° C.), and $ma_0$ represents a weight (initial weight) of the flame retardant before heating.

Further, the weight of each material subjected to the measurement test by using the TG-DTA before heating can be measured, for example, before the heat treatment by using the TG-DTA.

In a case in which the heat storage composition contains two or more flame retardants, the weight reduction ratio $\Delta ma(T)$ of the flame retardant measured by Measuring Method A1 is calculated as a total value obtained by multiplying the weight reduction ratio of each flame retardant obtained by using the TG-DTA by a ratio of the content of each flame retardant to a total content of the flame retardants and summing the obtained products.

For example, in a case in which the heat storage composition contains two types of flame retardants including a flame retardant 1 and a flame retardant 2, the contents of the flame retardants to the total content of the flame retardants are a1 and a2, respectively, and the weight reduction ratios of the flame retardants at the temperature T (° C.) are $\Delta ma1(T)$ and $\Delta ma2(T)$, respectively, the weight reduction ratio $\Delta ma(T)$ of the flame retardant obtained by Measuring Method A1 is obtained by the following expression.

$$\Delta ma(T)=a1*\Delta ma1(T)+a2*\Delta ma2(T)$$

Then, the gas generation temperature Tr (° C.) of the flame retardant is obtained by obtaining a temperature at which the weight reduction ratio $\Delta ma(T)$ of the flame retardant reaches 2% by mass by using Expression (A1).

<Measuring Method A2>

Measuring Method A2 of obtaining the gas generation temperature Ta of the specific composition is as follows.

First, a weight change of the heat storage composition due to heating is measured by using the TG-DTA. The measurement of the heat storage composition by using the TG-DTA is as described above.

A relational expression, which is represented by Expression (A2), between the temperature T (° C.) and a weight reduction ratio $\Delta m1(T)$ of the heat storage composition is derived based on the obtained measurement result.

$$\Delta m1(T)=(m1_0-m1(T))/(m1_0) \quad (A2)$$

In Expression (A2), m1(T) represents a weight of the heat storage composition at the temperature T (° C.) and $m1_0$ represents a weight of the heat storage composition before heating.

In addition, a type and a content of the specific solvent contained in the heat storage composition will be identified. Examples of the identifying method include known methods such as a method of quantifying an organic substance by gas chromatography-mass spectrometry (GC-MS) and a method of quantifying an inorganic substance by ion chromatography.

In a case in which the heat storage composition contains the specific solvent, the weight change of the identified specific solvent due to heating is measured by using the TG-DTA. The measurement of the specific solvent by using the TG-DTA is as described above.

A relational expression, which is represented by Expression (A3), between the temperature T (° C.) and a weight reduction ratio $\Delta mb(T)$ of the specific solvent is derived based on the obtained measurement result.

$$\Delta mb(T)=(mb_0-mb(T))/(mb_0) \quad (A3)$$

In Expression (A3), mb(T) represents a weight of the specific solvent at the temperature T (° C.) and $mb_0$ represents a weight of the specific solvent before heating.

In a case in which the heat storage composition contains two or more specific solvents, the weight reduction ratio $\Delta mb(T)$ of the specific solvent measured by Measuring Method A2 is calculated as a total value obtained by multiplying the weight reduction ratio of each specific solvent obtained by using the TG-DTA by a ratio of the content of each specific solvent to a total content of the specific solvents and summing the obtained products, in the same manner as the weight reduction ratio $\Delta ma(T)$ of the flame retardant measured by Measuring Method A1.

Next, a relational expression, which is represented by Expression (A4), between the temperature T (° C.) and a weight reduction ratio $\Delta mx(T)$ of the specific composition is derived.

$$\Delta mx(T)=(100*\Delta m1(T)-a*\Delta ma(T)-b*\Delta mb(T))/(100-a-b) \quad (A4)$$

In Expression (A4), a represents a ratio (% by mass) of the content of the flame retardant (in a case in which two or more flame retardants are present, the total content thereof) to the total mass of the heat storage composition. b represents a ratio (% by mass) of the content of the specific solvent (in a case in which two or more specific solvents are present, the total content thereof) to the total mass of the heat storage composition. Δma(T) represents the weight reduction ratio of the flame retardant obtained by Measuring Method A1.

A temperature at which the weight reduction ratio Δmx(T) of the specific composition reaches 2% by mass is obtained by using Expression (A4), and the obtained temperature is defined as the gas generation temperature Ta (° C.) of the specific composition.

As a result of comparison between the gas generation temperature Tr of the flame retardant obtained by Measuring Method A1 and the gas generation temperature Ta of the specific composition obtained by Measuring Method A2, in a case in which the gas generation temperature Tr of the flame retardant is lower than the gas generation temperature Ta of the specific composition (Ta−Tr>0), the heat storage composition satisfies Condition A.

It is presumed that in a case in which the heat storage composition satisfies Condition A, the flame extinguishing gas generated first by the decomposition of the flame retardant at the time of temperature rise reacts with the combustible gas generated later by the decomposition of the heat storage material to suppress the combustion of the heat storage composition, and thus the slow flame retardance of the heat storage composition is improved.

Further, the heat storage composition according to the embodiment of the present invention, which satisfies Condition A, is excellent in the slow flame retardance and excellent in the ignition resistance. The detailed mechanism by which the ignition resistance of the heat storage composition is improved by satisfying Condition A is not clear, but it is presumed that the reason is the same as the reason why the slow flame retardance is improved by satisfying Condition A.

The gas generation temperature Tr of the flame retardant in the heat storage composition and the gas generation temperature Ta of the specific composition are not particularly limited as long as Condition A is satisfied.

The gas generation temperature Tr of the flame retardant is preferably 100° C. or higher and more preferably 120° C. or higher, from the viewpoint of improving the stability of the heat storage composition at the time of usage. The upper limit of the gas generation temperature Tr of the flame retardant is not particularly limited as long as it is lower than the gas generation temperature Ta of the specific composition, but it is preferably a temperature sufficiently lower than the temperature at which the heat storage composition is heated at the time of combustion, and more preferably 300° C. or lower.

Further, the gas generation temperature Ta of the specific composition is preferably 100° C. or higher and more preferably 120° C. or higher, from the viewpoint of improving the stability of the heat storage composition at the time of usage.

It is preferable that the heat storage composition do not substantially contain a low molecular weight compound from the viewpoint of increasing the gas generation temperature Ta of the specific composition and improving the stability of the heat storage composition at the time of usage. The "Low molecular weight compound" refers to a compound having a molecular weight of 150 or less, and "do not substantially contain" means that the content thereof to the total mass of the heat storage composition is 1% by mass or less.

Further, from the viewpoint of being more excellent in storage stability of the heat storage composition, a difference between the gas generation temperature Tr of the flame retardant and the gas generation temperature Ta of the specific composition is preferably 100° C. or less and more preferably 50° C. or less.

[Component]

The components such as the heat storage material and the flame retardant contained in the heat storage composition will be described below in more detail.

The heat storage composition contains the heat storage material and the flame retardant, and the composition, the configuration, and the form thereof are not particularly limited as long as Condition A is satisfied.

The heat storage material contained in the heat storage composition may be present in a form encompassed in a microcapsule or may be present in a form not encompassed in the microcapsule.

In the heat storage composition, it is preferable that at least a part of the heat storage material be present to be encompassed in the microcapsule from the viewpoint that the heat storage material can be stably present in a phase state depending on the temperature and the viewpoints that the heat storage material which becomes liquid at high temperature can be prevented from leaking out of the heat storage composition, the surrounding members of the heat storage composition can be prevented from being contaminated, and the heat storage ability of the heat storage composition can be maintained.

Hereinafter, the heat storage material contained in the heat storage composition will be specifically described using the microcapsule as an example.

<Microcapsule (Heat Storage Material)>

The microcapsule contained in the heat storage composition has a core portion and a wall portion for encompassing a core material (encompassed material (also referred to as an encompassed component)) which forms the core portion, and the wall portion is also referred to as a "capsule wall".

(Core Material)

The microcapsule encompasses the heat storage material as the core material (encompassed component).

Since at least a part of the heat storage material is present by being encompassed in the microcapsule, the heat storage material can be stably present in a phase state depending on the temperature.

—Heat Storage Material—

The heat storage material can be appropriately selected from materials which can repeat the phase change between the solid phase and the liquid phase due to the state change of melting and solidification depending on the temperature change, depending on a target (for example, the heat generating body) or a purpose of heat amount control or heat utilization, or the like.

It is preferable that the phase change of the heat storage material be based on the melting point of the heat storage material itself.

The heat storage material may be, for example, any of a material which can store heat which is generated outside the heat storage composition as sensible heat or a material (hereinafter, also referred to as a "latent heat storage material") which can store heat which is generated outside the heat storage composition as latent heat. It is preferable that the heat storage material be a material which can dissipate the stored heat.

Above all, it is more preferable that the heat storage material be the latent heat storage material from the viewpoint of the control of the amount of heat which can be transferred, the control speed of heat, and the magnitude of the amount of heat.

Latent Heat Storage Material

The latent heat storage material refers to a material which stores heat, which is generated outside the heat storage composition, as latent heat, and transfers heat due to latent heat by repeating the change between melting and solidification with the melting point determined by the material as a phase change temperature.

The latent heat storage material can utilize the heat of fusion at the melting point and the heat of solidification at a solidifying point, store heat depending on the phase change between the solid and the liquid, and dissipate heat.

The latent heat storage material can be selected from compounds having a melting point and capable of changing a phase.

Examples of the latent heat storage material include ice (water); an aliphatic hydrocarbon such as paraffin (for example, isoparaffin and normal paraffin) and the like; an inorganic salt; an organic acid ester compound such as caprylic/capric triglyceride, methyl myristate (melting point of 16° C. to 19° C.), isopropyl myristate (melting point of 167° C.), and dibutyl phthalate (melting point of −35° C.); an aromatic hydrocarbon such as an alkylnaphthalene compound such as diisopropylnaphthalene (melting point of 67° C. to 70° C.), a diarylalkane compound such as 1-phenyl-1-xylylethane (melting point lower than −50° C.), an alkylbiphenyl compound such as 4-isopropylbiphenyl (melting point of 11° C.), a triarylmethane compound, an alkylbenzene compound, a benzylnaphthalene compound, a diarylalkylene compound, and an aryl indane compound; natural animal and plant oils such as camellia oil, soybean oil, corn oil, cotton seed oil, rapeseed oil, olive oil, coconut oil, castor oil, and fish oil; and high boiling point distillates of natural products such as mineral oil.

Among the latent heat storage materials, from the viewpoint of exhibiting the excellent heat storage property, paraffin is preferable.

As the paraffin, an aliphatic hydrocarbon having a melting point of 0° C. or higher is preferable, and an aliphatic hydrocarbon having a melting point of 0° C. or higher and having 14 or more carbon atoms is more preferable.

Examples of the aliphatic hydrocarbon having the melting point of 0° C. or higher include tetradecane (melting point of 6° C.), pentadecane (melting point of 10° C.), hexadecane (melting point of 18° C.), heptadecane (melting point of 22° C.), octadecane (melting point of 28° C.), nonadecane (melting point of 32° C.), icosane (melting point of 37° C.), henicosane (melting point of 40° C.), docosane (melting point of 44° C.), tricosane (melting point of 48° C. to 50° C.), tetracosane (melting point of 52° C.), pentacosane (melting point of 53° C. to 56° C.), heptacosane (melting point of 60° C.), octacosane (melting point of 65° C.), nonacosane (melting point of 63° C. to 66° C.), and triacontane (melting point of 64° C. to 67° C.).

As the inorganic salt, an inorganic hydrated salt is preferable, and the examples thereof include alkali metal chloride hydrate (for example, sodium chloride dihydrate), alkali metal acetate hydrate (for example, sodium acetate hydrate), alkali metal sulfate hydrate (for example, sodium sulfate hydrate), alkali metal thiosulfate hydrate (for example, sodium thiosulfate hydrate), alkaline earth metal sulfate hydrate (for example, calcium sulfate hydrate), and alkaline earth metal chloride hydrate (for example, calcium chloride hydrate).

The melting point of the heat storage material can be selected depending on the type of the heat generating body which generates heat, a heat generating temperature of the heat generating body, a temperature or a holding temperature after cooling, and the purpose of a cooling method. By appropriately selecting the melting point, for example, it is possible to stably maintain the temperature of the heat generating body which generates heat at an appropriate temperature which does not overcool.

It is preferable that the heat storage material be selected mainly from a material having the melting point at a center temperature of a target temperature range (for example, an operating temperature of the heat generating body; hereinafter, also referred to as a "heat control range").

The heat storage material can be selected depending on the melting point of the heat storage material for the heat control range. The heat control range is set depending on the applications (for example, the type of heat generating body).

Specifically, the melting point of the heat storage material to be selected differs depending on the heat control range, but the material having the following melting points can be suitably selected as the heat storage material. The heat storage material is suitable in a case in which the application is an electronic device (in particular, a small, portable, or handy electronic device).

(1) Among the heat storage materials described above (preferably, the latent heat storage material), the heat storage material having the melting point of 0° C. or higher and 80° C. or lower is preferable.

In a case in which the heat storage material having the melting point of 0° C. or higher and 80° C. or lower is used, the material having the melting point lower than 0° C. or higher than 80° C. is not included in the heat storage material. Among the materials having the melting point lower than 0° C. or higher than 80° C., the material in the liquid state may be used in combination with the heat storage material as a solvent.

(2) Among the above, the heat storage material having the melting point of 10° C. or higher and 70° C. or lower is more preferable.

In a case in which the heat storage material having the melting point of 10° C. or higher and 70° C. or lower is used, the material having the melting point lower than 10° C. or higher than 70° C. is not included in the heat storage material. Among the materials having the melting point lower than 10° C. or higher than 70° C., the material in the liquid state may be used in combination with the heat storage material as a solvent.

(3) Further, the heat storage material having the melting point of 15° C. or higher and 50° C. or lower is further preferable.

In a case in which the heat storage material having the melting point of 15° C. or higher and 50° C. or lower is used, the material having the melting point lower than 15° C. or higher than 50° C. is not included in the heat storage material. Among the materials having the melting point lower than 15° C. or higher than 50° C., the material in the liquid state may be used in combination with the heat storage material as a solvent.

The heat storage material may be used alone or in combination of a plurality of types. By using the heat storage material alone or a plurality of types of heat storage materials having different melting points, it is possible to adjust the temperature range in which the heat storage property is exhibited and the amount of heat storage depending on the applications.

The temperature range in which heat can be stored can be expanded by mixing two types of other heat storage materials having the melting points higher and lower the center temperature with the heat storage material, as a center material, having the melting point at the center temperature at which the heat storage effect of the heat storage material is desired. An example of a case in which the paraffin is used as the heat storage material will be specifically described. Paraffin a having the melting point at the center temperature at which the heat storage effect of the heat storage material is desired is used as a center material, and the paraffin a and two types of other paraffins having the carbon atoms more than or less than the carbon atoms of the paraffin a are mixed, so that the material can be designed to have a wide temperature range (heat control range).

Further, the content of paraffin having the melting point at the center temperature at which the heat storage effect is desired to the total mass of the heat storage material is preferably 80% by mass or more, more preferably 90% by mass or more, and further preferably 95% by mass or more.

On the other hand, depending on the applications such as the electronic device, it is also preferable that the heat storage material contained in the heat storage composition be substantially one type. In a case in which the heat storage material to be used is substantially one type, the heat storage composition is filled with the heat storage material with the high purity, so that the endothermic property of the electronic device with respect to the heat generating body is good. Here, substantially one type of the heat storage material refers to that the content of the heat storage material having the largest content among a plurality of the heat storage materials contained in the heat storage composition to the total mass of all of the heat storage materials contained in the heat storage composition is 95% by mass or more, and is preferably 98% by mass or more. The upper limit value is not particularly limited and need only be 100% by mass or less.

In a case in which the paraffin is used as the latent heat storage material, for example, the paraffin may be used alone or in combination of two types or more. In a case in which a plurality of paraffins having different melting points are used, it is possible to widen the temperature range in which the heat storage property is exhibited.

In a case in which the plurality of paraffins are used, from the viewpoint of the temperature range in which the heat storage property is exhibited and the amount of heat storage, the content of the main paraffin to the total mass of the paraffin is preferably 80% to 100% by mass, more preferably 90% to 100% by mass, and further preferably 95% to 100% by mass. The "main paraffin" refers to the paraffin having the largest content among the plurality of paraffins which are contained. The content of the main paraffin to the total amount of the plurality of paraffins is preferably 50% by mass or more.

The content of the paraffin to the total mass of the heat storage material (preferably, latent heat storage material) is preferably 80% to 100% by mass, more preferably 90% to 100% by mass, and further preferably 95% to 100% by mass.

In the heat storage composition, the heat storage material may be present outside the microcapsule. That is, the heat storage composition may contain the heat storage material which is encompassed in the microcapsule, and the heat storage material which is present inside the heat storage composition and outside the microcapsule. In this case, it is preferable that 95% by mass or more of the heat storage material be encompassed in the microcapsule based on the total mass of the heat storage material contained in the heat storage composition. That is, the content (encompassing ratio) of the heat storage material which is encompassed in the microcapsule is preferably 95% by mass or more based on the total mass of the heat storage material contained in the heat storage composition. The upper limit is not particularly limited, but 100% by mass can be adopted, for example.

As the heat storage material in the heat storage composition, 95% by mass or more of the heat storage material based on the total mass is encompassed in the microcapsule, so that it is advantageous from the viewpoints that the heat storage material which becomes a liquid at a high temperature can be prevented from leaking out of the heat storage composition, the surrounding members and the like in which the heat storage composition is used can be prevented from being contaminated, the heat storage ability as the heat storage composition can be maintained, and combustion and ignition are delayed.

In the present disclosure, from the viewpoint of the heat storage property of the heat storage composition, the content of the heat storage material in the heat storage composition to the total mass of the heat storage composition is preferably 65% by mass or more, more preferably 70% by mass or more, further preferably 75% by mass or more, and particularly preferably 80% by mass or more. In a case in which the configuration of the present disclosure is applied to the heat storage composition having the heat storage material in content of 65% by mass or more, the slow flame retardance and the ignition resistance can be improved while maintaining a high heat absorption amount. The content of the heat storage material can be adjusted by a method of thinning the wall thickness of the microcapsule, a method of increasing the content of the microcapsules, and combining both methods. The content of the heat storage material in the heat storage composition to the total mass of the heat storage composition is preferably 99.9% by mass or less, more preferably 99% by mass or less, and further preferably 98% by mass or less.

The measurement of the content of the heat storage material in the heat storage composition is performed by the following method.

First, the heat storage material is extracted from the heat storage composition, and the type of the heat storage material is identified. In a case in which the heat storage material is formed by a plurality of types, the mixing ratio thereof is also identified. Examples of the identification method include nuclear magnetic resonance (NMR) measurement and infrared spectroscopy (IR) measurement. Further, as an example of the extracting method of the heat storage material from the heat storage composition, there is a method of immersing the heat storage composition in the solvent (for example, an organic solvent) to extract the heat storage material.

Next, the heat storage material contained in the heat storage composition identified by the above procedure is separately prepared, and a heat absorption amount (J/g) of the heat storage material alone is measured by using differential scanning calorimeter (DSC). The obtained heat absorption amount is defined as a heat absorption amount A. As described above, in a case in which the heat storage material is formed by a plurality of types, the heat storage material with the mixing ratio is separately prepared and the heat absorption amount is measured.

Then, the heat absorption amount of the heat storage composition is measured by the same method as above. The obtained heat absorption amount is defined as a heat absorption amount B.

Next, a ratio X (%) {(B/A)×100} of the heat absorption amount B to the heat absorption amount A is calculated. The ratio X corresponds to the content of the heat storage material in the heat storage composition (a ratio of the content of the heat storage material to the total mass of the heat storage composition). For example, in a case in which the heat storage composition is formed by only the heat storage material, the heat absorption amount A and the heat absorption amount B have the same value, and the ratio X (%) is 100%. On the other hand, in a case in which the content of the heat storage material in the heat storage composition is a predetermined ratio, the heat absorption amount is a value corresponding to the ratio. That is, the content of the heat storage material in the heat storage composition can be obtained by comparing the heat absorption amount A and the heat absorption amount B.

—Other Components—

Examples of other components that can be encompassed in the microcapsule as the core material include the solvent and an additive such as the flame retardant.

Other components can be encompassed in the microcapsule as the core material, but from the viewpoint of the heat storage property, the content of the heat storage material in the core material to the total mass of the core material is preferably 80% to 100% by mass, and more preferably 100% by mass.

In the core portion, the microcapsule may contain the solvent as an oil component as long as the effect of the heat storage property in the present disclosure is not significantly impaired.

Examples of the solvent include the heat storage material described above of which melting point is outside the temperature range in which the heat storage composition is used (heat control range; for example, the operating temperature of the heat generating body). That is, the solvent refers to a solvent which does not change the phase in the liquid state in the heat control range, and is distinguished from the heat storage material which undergoes a phase transition in the heat control range to cause an endothermic reaction or a heat dissipation reaction.

The content of the solvent in the encompassed component to the total mass of the encompassed component is preferably less than 30% by mass, more preferably less than 10% by mass, and further preferably 1% by mass or less. The lower limit is not particularly limited, but 0% by mass can be adopted, for example.

The solvent may be used alone or in combination of two types or more.

In addition to the above components, the core material in the microcapsule can encompass, as needed, additives such as an ultraviolet absorbing agent, a light stabilizer, an antioxidant, a wax, and an odor suppressant.

(Wall Portion (Capsule Wall))

The microcapsule includes the wall portion (capsule wall) which encompasses the core material.

The microcapsule has the capsule wall, so that capsule particles can be formed and the core material described above which forms the core portion can be encompassed.

—Forming Material of Capsule Wall—

The material which forms the capsule wall in the microcapsule is not particularly limited as long as the material is a polymer, and examples thereof include polyurethane, polyurea, polyurethane urea, a melamine resin, and an acrylic resin. From the viewpoint of thinning the capsule wall to impart the excellent heat storage property, polyurethane, the material is preferably polyurea, polyurethane urea, or a melamine resin, and more preferably polyurethane, polyurea, or polyurethane urea. Further, polyurethane, polyurea, or polyurethane urea is more preferable from the viewpoint of being capable of preventing a case in which a phase change, a structural change, or the like of the heat storage material is unlikely to occur at the interface between the wall material and the heat storage material.

Further, it is preferable that the microcapsule be present as a deformable particle.

In a case in which the microcapsule is the deformable particle, the microcapsule can be deformed without breaking, and a filling ratio of the microcapsule can be improved. As a result, it is possible to increase the amount of the heat storage material in the heat storage composition, and more excellent heat storage property can be realized. From this viewpoint, polyurethane, polyurea, or polyurethane urea is preferable as the material which forms the capsule wall.

Deformation of microcapsule without breaking can be regarded as a deformed state as long as, regardless of the degree of deformation, deformation is recognized from the shape of each microcapsule in a state in which no external pressure is applied. For example, it refers to a property of relaxing the pressure applied to the capsule by deformation and maintaining a state in which the core material is encompassed in the microcapsule without capsule wall breaking even in a case in which the microcapsules are pressed against each other in the sheet and the pressure applied to each capsule, in a case in which the microcapsules are to be densely present in the sheet.

The deformation which occurs in the microcapsule includes deformation in which spherical surfaces come into contact with each other to form a flat contact surface, for example, in a case in which the microcapsules are pressed against each other in the sheet.

From the viewpoint, the deformation ratio of the microcapsule is preferably 10% or more, and more preferably 30% or more. Also, from the viewpoints of the physical strength and the durability of the capsule, the upper limit of the deformation ratio of the microcapsule may be 80% or less.

(Content of Microcapsule)

In many cases, the content of the microcapsule in the heat storage composition to the total mass of the heat storage composition is 70% by mass or more. Above all, it is preferably 75% by mass or more. By setting the content of the microcapsule to 75% by mass or more, the presence amount of the heat storage materials to the total mass of the heat storage composition can be increased, and as a result, the heat storage composition which exhibits the excellent heat storage property is obtained.

It is preferable that the content of the microcapsule in the heat storage composition be high, from the viewpoint of the heat storage property. Specifically, the content of the microcapsule in the heat storage composition is preferably 80% by mass or more, more preferably 85% to 99% by mass, and further preferably 90% to 99% by mass.

The microcapsule may be used alone or in combination of two types or more.

(Manufacturing Method of Microcapsule)

The microcapsule can be manufactured, for example, by the following method.

In a case in which the capsule wall is formed of polyurethane, polyurea, or polyurethane urea, examples of a manufacturing method of the microcapsule include a method in which an interfacial polymerization method is applied, which includes a step (emulsification step) of dispersing the oil phase including the heat storage material and a capsule wall material in the water phase including the emulsifier to prepare an emulsified liquid, and a step (capsulizing step) of polymerizing the capsule wall material at the interface between the oil phase and the water phase to form the capsule wall, and forming the microcapsule which encompasses the heat storage material.

Examples of the capsule wall material include the capsule wall material containing polyisocyanate and at least one selected from the group consisting of polyol and polyamine. A part of polyisocyanate may react with water in a reaction system to be polyamine. Therefore, in a case in which the capsule wall material contains at least polyisocyanate, a part of the polyisocyanate can be converted into polyamine to react with polyamine to synthesize polyurea.

In a case in which the capsule wall is formed of a melamine formaldehyde resin, the microcapsule can be manufactured by applying a coacervation method including a step (emulsification step) of dispersing the oil phase containing the heat storage material in the water phase containing the emulsifier to prepare the emulsified liquid, and a step (capsulizing step) of adding the capsule wall material to the water phase, forming a polymer layer of the capsule wall material on a surface of emulsified liquid droplet, and forming the microcapsule which encompasses the heat storage material.

—Emulsification Step—

In the emulsification step, in a case in which the capsule wall is formed of polyurethane, polyurea, or polyurethane urea, the oil phase containing the heat storage material and the capsule wall material is dispersed in the water phase containing the emulsifier to prepare the emulsified liquid.

Further, in a case in which the capsule wall is formed of a melamine formaldehyde resin, the oil phase containing the heat storage material is dispersed in the water phase containing the emulsifier to prepare the emulsified liquid.

~Emulsified Liquid~

The emulsified liquid is formed by dispersing the oil phase containing the heat storage material and, as needed, the capsule wall material in the water phase containing the emulsifier.

(1) Oil Phase

The oil phase contains at least the heat storage material, and may further contain components such as the capsule wall material, the solvent, and/or the additive, as needed.

Examples of the solvent include the heat storage material described above of which melting point is outside the temperature range in which the heat storage composition is used (heat control range; for example, the operating temperature of the heat generating body).

(2) Water Phase

The water phase contains at least an aqueous medium and the emulsifier.

—Aqueous Medium—

Examples of the aqueous medium include water and a mixed solvent of water and a water-soluble organic solvent, and water is preferable. The "water-soluble" of the water-soluble organic solvent refers to that a dissolved amount of a target substance in 100% by mass of water at 25° C. is 5% by mass or more.

The content of the aqueous medium is preferably 20% to 80% by mass, more preferably 30% to 70% by mass, and further preferably 40% to 60% by mass, based on the total mass of the emulsified liquid which is a mixture of the oil phase and the water phase.

—Emulsifier—

A dispersing agent, a surfactant, or a combination thereof is included in the emulsifier.

Examples of the dispersing agent include a binder which will be described below, and polyvinyl alcohol is preferable.

As the polyvinyl alcohol, a commercially available product may be used, and examples thereof include Kuraray Poval series manufactured by Kuraray Co., Ltd. (for example, Kuraray Poval PVA-217E, Kuraray Poval KL-318, and the like).

From the viewpoint of the dispersibility of the microcapsule, the degree of polymerization of the polyvinyl alcohol is preferably 500 to 5000, and more preferably 1000 to 3000.

Examples of the surfactant include a nonionic surfactant, an anionic surfactant, a cationic surfactant, and an amphoteric surfactant. The surfactant may be used alone or may be used in a combination of two types or more.

As the emulsifier, the emulsifier which can be bonded to polyisocyanate described above is preferable from the viewpoint of improving a film hardness. For example, in the case in which microcapsule is manufactured by using the capsule wall material containing polyisocyanate, polyvinyl alcohol as the emulsifier can be bonded to polyisocyanate. That is, the hydroxyl group in polyvinyl alcohol can be bonded to polyisocyanate.

The concentration of the emulsifier is preferably more than 0% by mass and 20% by mass or less, more preferably 0.005% to 10% by mass, further preferably 0.01% to 10% by mass, and particularly preferably 1% to 5% by mass, based on the total mass of the emulsified liquid which is a mixture of the oil phase and the water phase.

As will be described below, in a case in which the heat storage composition is produced by using the dispersion liquid in which the microcapsules produced by using the emulsifier are dispersed, the emulsifier may remain as the binder in the heat storage composition. As will be described below, in order to reduce the content of the binder in the heat storage composition, it is preferable that the usage amount of the emulsifier be small as long as the emulsification performance is not impaired.

The water phase may contain other components such as an ultraviolet absorbing agent, an antioxidant, and a preservative, as needed.

In a case in which the heat storage composition contains the microcapsule, the flame retardant may be contained in any one of the oil phase or the water phase, and is preferably contained in the water phase.

~Dispersion~

Dispersion refers to dispersing the oil phase as oil droplets in the water phase (emulsification). Dispersion can be performed by using a known unit used to disperse the oil phase and the water phase, such as homogenizer, manton gaulin, ultrasound disperser, dissolver, keddy mill, or other known dispersion apparatuses.

The mixing ratio of the oil phase to the water phase (oil phase mass/water phase mass) is preferably 0.1 to 1.5, more preferably 0.2 to 1.2, and further preferably 0.4 to 1.0. In a case in which the mixing ratio is in the range of 0.1 to 1.5, the appropriate viscosity can be maintained, the manufacturing suitability is excellent, and the stability of the emulsified liquid is also excellent.

—Capsulizing Step—In the capsulizing step, the capsule wall material is polymerized at the interface between the oil phase and the water phase to form the capsule wall, and the microcapsule which encompasses the heat storage material is formed.

~Polymerization~

Polymerization is a step of polymerizing the capsule wall material contained in the oil phase in the emulsified liquid at the interface with the water phase to form the capsule wall. The polymerization is preferably performed under heating. A reaction temperature in the polymerization is preferably 40° C. to 100° C., and more preferably 50° C. to 80° C. A reaction time of polymerization is preferably about 0.5 to 10 hours, and more preferably about 1 to 5 hours. The polymerization time is shorter as the polymerization temperature is higher, but in a case in which encompassing material and/or capsule wall material which may decompose at a high temperature is used, it is desirable to select a polymerization initiator which acts at a low temperature to perform polymerization at a relatively low temperature.

In order to prevent the aggregation of the microcapsules in a polymerization step, it is preferable that an aqueous solution (for example, water, an aqueous acetic acid solution, and the like) be further added to reduce the collision probability between the microcapsules, and it is also preferable that sufficient stirring be performed. A dispersing agent for preventing aggregation may be added again in the polymerization step. Further, as needed, a charge adjusting agent such as nigrosin or any other auxiliary agent can be added to the emulsified liquid. These auxiliary agents can be added to the emulsified liquid when forming the capsule wall or in any point in time.

The heat storage material contained in the heat storage composition may be present in a form not encompassed in the microcapsule. It is preferable that the composition of the heat storage composition in a case in which the heat storage material contained in the heat storage composition is not encompassed in the microcapsule be the same as the composition of the heat storage composition in a case of containing the microcapsule except that a composition corresponding to the core material is contained instead of the microcapsule.

The composition corresponding to the core material in this case may be the same as that described for the core material, including its preferable composition and embodiment.

<Flame Retardant>

The flame retardant contained in the heat storage composition is not particularly limited as long as the gas generation temperature Tr measured by Measuring Method A1 has a composition that satisfies Condition A.

The flame retardant is not particularly limited as long as a range of the gas generation temperature Tr is appropriate, but in a case in which the heat storage composition is used in the electronic device, a non-metallic material is preferable from the viewpoint of preventing contamination and suppressing conductivity. Above all, from the viewpoints of environmental consideration and corrosiveness, a material which does not contain a halogen is preferable, and a phosphorus-containing material (that is, a flame retardant containing a phosphorus atom) is more preferable.

Further, it is preferable that the flame retardant be not encapsulated. By disposing the non-encapsulated flame retardant outside the capsule encompassing the heat storage material, the flame retardant can be combusted faster than the specific composition is combusted, resulting in more excellent slow flame retardance and ignition resistance can be obtained.

The heat storage composition further preferably contains at least one selected from diammonium hydrogen phosphate, ammonium dihydrogen phosphate, or trimethyl phosphate as the flame retardant, and from the viewpoint of being more excellent in the storage stability of the heat storage composition, the heat storage composition particularly preferably contains diammonium hydrogen phosphate or ammonium dihydrogen phosphate.

As the phosphorus-containing material, a commercially available product may be used, and examples thereof include the Taien series manufactured by Taihei Chemical Industrial Co., Ltd. (for example, Taien N and the like).

The heat storage composition may contain a flame retardant other than the preferable flame retardant described above (hereinafter, also referred to as "other flame retardants") as long as Condition A is satisfied.

Other flame retardants are not particularly limited, and a known flame retardant can be used. For example, the flame retardant described in "Practical application and technology of flame retardant materials" (published by CMC Publishing Co., Ltd.), and the like can be used, and a halogen-based flame retardant, a flame retardant containing the phosphorus atom (a phosphorus-based flame retardant), or an inorganic flame retardant is preferably used. In a case in which it is desirable to suppress the mixing of halogen in electronic applications, the phosphorus-based flame retardant or the inorganic flame retardant is more preferably used.

Examples of the phosphorus-based flame retardant included in other flame retardants include a phosphate-based material such as triphenyl phosphate, tricresyl phosphate, trixylenyl phosphate, cresyl phenyl phosphate, and 2-ethylhexyl diphenyl phosphate, aromatic phosphate esters other than the phosphate-based material, aromatic condensed phosphate esters, polyphosphates, phosphinic acid metal salts, red phosphorus, and the like.

In a case in which the heat storage composition contains the microcapsule that encompasses the heat storage material, the flame retardant may be present in any of the inside, the wall portion, or the outside of the microcapsule, but it is preferable that the flame retardant be present outside the microcapsule, from the viewpoint of not changing the characteristics such as heat storage property of the microcapsule and the strength of the capsule wall portion.

The flame retardant may be used alone or may be used in a combination of two types or more.

From the viewpoints of the heat storage property and the flame retardance, the content of the flame retardant in the heat storage composition to the total mass of the heat storage composition is preferably 0.01% to 20% by mass, more preferably 0.01% to 15% by mass, and further preferably 0.05% to 5% by mass.

Further, the content of the flame retardant to the content of the heat storage material is preferably 0.01% by mass or more and more preferably 0.1% by mass or more, from the viewpoint of being more excellent in the flame retardance. The upper limit thereof is not particularly limited, but in a case in which the content is large, the content of the heat storage material in the heat storage member is small and the amount of heat storage is small, and thus it is preferably 5% by mass or less and more preferably 1% by mass or less.

It is also preferable that the heat storage composition contain an auxiliary flame retardant in combination with the flame retardant. Examples of the auxiliary flame retardant include pentaerythritol, phosphorous acid, 22-oxidized tetrazinc 12-boron heptahydrate, and the like.

<Binder>

It is preferable that the heat storage composition contain, in addition to the microcapsule, at least one binder outside the microcapsule. Since the heat storage composition contains the binder, durability can be imparted.

As described above, the emulsifier, such as polyvinyl alcohol, may be used in a case in which the microcapsule is manufactured. Therefore, in a case in which the heat storage composition is produced by using the microcapsule-containing composition formed by using the emulsifier, the heat storage composition may contain the binder derived from the emulsifier.

The binder is not particularly limited as long as it is a polymer which can form a film, and examples thereof include a water-soluble polymer, and an oil-soluble polymer.

The "water-soluble" of the water-soluble polymer means that a dissolved amount of a target substance in 100% by mass of water at 25° C. is 5% by mass or more. As the water-soluble polymer, a polymer having a dissolved amount of 10% by mass or more is preferable.

Further, the "oil-soluble polymer" which will be described below refers to a polymer other than the "water-soluble polymer" described above.

Examples of the water-soluble polymer include polyvinyl alcohol and its modified product, polyacrylic acid amide and its derivative, a styrene-acrylic acid copolymer, sodium polystyrene sulfonate, an ethylene-vinyl acetate copolymer, a styrene-maleic acid anhydride copolymer, an ethylene-maleic acid anhydride copolymer, an isobutylene-maleic acid anhydride copolymer, a polyvinylpyrrolidone, ethylene-acrylic acid copolymer, a vinyl acetate-acrylic acid copolymer, carboxymethyl cellulose, methyl cellulose, casein, gelatin, a starch derivative, gum arabic, and sodium alginate, and polyvinyl alcohol is preferable.

Examples of the oil-soluble polymer include polymers having the heat storage properties disclosed in WO2018/207387A and JP2007-31610A, and a polymer having a long-chain alkyl group (more preferably, a long-chain alkyl group having 12 to 30 carbon atoms) is preferable, and an acrylic resin having a long-chain alkyl group (more preferably, a long-chain alkyl group having 12 to 30 carbon atoms) is more preferable.

Also, in addition to the above, examples of the oil-soluble polymer include a modified product of polyvinyl alcohol, a derivative of polyacrylic acid amide, an ethylene-vinyl acetate copolymer, a styrene-maleic acid anhydride copolymer, an ethylene-maleic acid anhydride copolymer, an isobutylene-maleic acid anhydride copolymer, an ethylene-acrylic acid copolymer, a vinyl acetate-acrylic acid copolymer, and a styrene-acrylic acid copolymer.

Among the above binders, from the viewpoint of making the content of microcapsule in the heat storage composition 70% by mass or more (preferably, 75% by mass or more), the water-soluble polymer is preferable, polyol is more preferable, and polyvinyl alcohol is further preferable. By using the water-soluble polymer, the composition can be prepared, which is suitable for forming the sheet-shaped heat storage composition while maintaining the dispersibility in a case in which an oil in a water type (O/W type) microcapsule liquid using the oil-soluble material such as paraffin as the core material is prepared. Therefore, it is easy to adjust the content of the microcapsule in the heat storage composition to 70% by mass or more.

As the polyvinyl alcohol, a commercially available product on the market may be used, and examples thereof include Kuraray Poval series manufactured by Kuraray Co., Ltd. (for example, Kuraray Poval PVA-217E, Kuraray Poval KL-318, or the like).

Further, in a case in which the binder is polyvinyl alcohol, from the viewpoint of the dispersibility and the film hardness of the microcapsule, the degree of polymerization of polyvinyl alcohol is preferably 500 to 5000, and more preferably 1000 to 3000.

From the viewpoint of easily adjusting the content of the microcapsule in the heat storage composition to 70% by mass or more while maintaining the film hardness of the heat storage composition, the content of the binder in the heat storage composition is preferably 0.1% to 20% by mass, and more preferably 1% to 11% by mass.

The smaller content of the binder is preferable in that the amount of microcapsule to the total mass is increased. Further, in a case in which the content of the binder is in a range not too small, the binder easily protects the microcapsule and maintains the ability of forming the layer which includes the microcapsules, so that microcapsule which has the physical strength can be easily obtained.

In the heat storage composition, the content of the binder to the total mass of the microcapsule is not particularly limited, but it is preferably 15% by mass or less, and more preferably 11% by mass or less, from the viewpoint of being more excellent in the heat storage property of the heat storage composition. The lower limit is not particularly limited, but it is preferably 0.1% by mass or more.

~Molecular Weight~

From the viewpoint of the film hardness, a number average molecular weight (Mn) of the binder is preferably 20000 to 300000, and more preferably 20000 to 150000.

The number average molecular weight (Mn) of the binder is a value measured by gel permeation chromatography (GPC).

For the measurement by gel permeation chromatography (GPC), HLC (registered trademark)-8020 GPC (manufactured by Tosoh Corporation) is used as a measuring device, and three TSK gel (registered trademark) Super Multipore HZ-H (4.6 mm ID×15 cm, manufactured by Tosoh Corporation) are used as a column, and THF (tetrahydrofuran) is used as the eluent. As a measurement condition, a sample concentration is 0.45% by mass, a flow rate is 0.35 ml/min, a sample injection amount is 10 μl, a measurement temperature is 40° C., and a refractive index (RI) detector is used.

The calibration curve is produced from 8 samples of "standard sample TSK standard polystyrene" manufactured by Tosoh Corporation: "F-40", "F-20", "F-4", "F-1", "A-5000", "A-2500", "A-1000", and "n-propylbenzene".

<Solvent>

The heat storage composition may contain the solvent. In a case in which the heat storage composition contains the microcapsule, the heat storage composition preferably contains the solvent as a dispersion medium. Since the heat storage composition contains the solvent as the dispersion medium of the microcapsule, the heat storage composition can be easily blended with other materials in a case of being used for various applications.

The solvent can be appropriately selected depending on the applications of the heat storage composition. As the solvent contained in the heat storage composition containing the microcapsule, a liquid component that does not affect the wall material of the microcapsule is preferable. Examples of the liquid component include an aqueous solvent, a viscosity adjuster, a stabilizer, and the like. Examples of the stabilizer include the emulsifier that can be used in the above water phase.

Examples of the aqueous solvent include water, such as ion exchange water, and alcohol.

The solvent contained in the heat storage composition may be used alone or in combination of two types or more.

In a case in which the heat storage composition contains the solvent, the content of the solvent can be appropriately selected depending on the applications, and is preferably 0.0001% to 0.1% by mass.

Further, the heat storage composition may contain the specific solvent having the boiling point of 100° C. or lower.

Examples of the specific solvent include water and aqueous organic solvents such as alcohols having 1 to 7 carbon atoms, ketones, and esters.

The specific solvent contained in the heat storage composition may be used alone or in combination of two types or more.

In a case in which the heat storage composition contains the specific solvent, the content of the specific solvent to the total mass of the heat storage composition is preferably 1% by mass or less. Above all, it is more preferable that the heat storage composition do not substantially contain the specific solvent. "Do not substantially contain the specific solvent" means that the content of the specific solvent is 0.5% by mass or less with respect to the total mass of the heat storage composition. The lower limit is not particularly limited and may be 0% by mass (equal to or less than the detection limit).

<Other Components>

The heat storage composition may include other components such as a thermal conductive material, an ultraviolet absorbing agent, an antioxidant, and a preservative in the outside of the microcapsule, as needed.

The content of the other components which may be outside the microcapsule to the total mass of the heat storage composition is preferably 10% by mass or less, and more preferably 5% by mass or less. It is preferable that the heat storage composition do not substantially contain other components described above from the viewpoint of increasing the gas generation temperature Ta of the specific composition described above and improving the stability of the heat storage composition at the time of usage. "Do not substantially contain" means that the content thereof is 1% by mass or less with respect to the total mass of the heat storage composition. Further, the total amount of the microcapsule and the binder to the total mass of the heat storage composition is preferably 80% by mass or more, more preferably 90% to 100% by mass, and further preferably 98% to 100% by mass.

–Thermal Conductive Material–

It is preferable that the heat storage composition further contain the thermal conductive material in the outside the microcapsule. By containing the thermal conductive material, the heat radiation property from the heat storage composition after heat storage is excellent, and the cooling efficiency, the cooling rate, the temperature of the heat generating body which generates heat can be satisfactorily maintained.

The "thermal conductivity" of the thermal conductive material refers to a material having the thermal conductivity of 10 Wm$^{-1}$K$^{-1}$ or more. Above all, it is preferable that the thermal conductivity of the thermal conductive material be 50 Wm$^{-1}$K$^{-1}$ or more, from the viewpoint of improving the heat radiation property of the heat storage composition.

The thermal conductivity (unit: Wm$^{-1}$K$^{-1}$) is a value measured by a flash method at a temperature of 25° C. by a method compliant with Japanese Industrial Standards (JIS) R1611.

Examples of the thermal conductive material include carbon (artificial graphite, carbon black, or the like; 100 to 250), carbon nanotubes (3000 to 5500), metals (for example, silver: 420, copper: 398, gold: 320, aluminum: 236, iron: 84, platinum: 70, stainless steel: 16.7 to 20.9, nickel: 90.9), and silicon (Si; 168).

The numerical values in parentheses described above indicate the thermal conductivity (unit: Wm$^{-1}$K$^{-1}$) of each material.

It is preferable that the content of the thermal conductive material in the heat storage composition to the total mass of the heat storage composition be 2% by mass or more. From the viewpoint of the balance between heat storage and heat radiation of the heat storage composition, the content of the thermal conductive material is preferably 10% by mass or less, and more preferably 5% by mass or less.

[Characteristic of Heat Storage Composition]

(Latent Heat Capacity)

From the viewpoints of the high heat storage property and suitability for temperature control of a heat generating body which generates heat, the latent heat capacity of the heat storage composition is preferably 110 J/ml or more, more preferably 135 J/ml or more, and further preferably 145 J/ml or more. The upper limit is not particularly limited, but it is 400 J/ml or less in many cases.

The latent heat capacity is a value calculated from the result of the differential scanning calorimetry (DSC) and the thickness of the heat storage composition.

From the viewpoint of exhibiting a high amount of heat storage in a limited space, the amount of heat storage from in a unit of "J/ml (amount of heat storage per unit volume)" is appropriate, but in a case of the applications to the electronic device, the weight of the electronic device is also important. Therefore, from the viewpoint of exhibiting a high heat storage property in a limited mass, the amount of heat storage in a unit of "J/g (amount of heat storage per unit mass)" may be appropriate. In this case, the latent heat capacity is preferably 140 J/g or more, more preferably 150 J/g or more, further preferably 160 J/g or more, and particularly preferably 190 kg or more. The upper limit is not particularly limited, but it is 450 J/g or less in many cases.

(Void Ratio)

A ratio of the volume of the microcapsule to the volume of the heat storage composition is preferably 40% by volume or more, more preferably 60% by volume or more, and further preferably 80% by volume or more. The upper limit is not particularly limited, but 100% by volume can be adopted, for example.

In a case in which there is a void in the heat storage composition, the volume of the heat storage composition is large even in a case in which the content of the heat storage material or the microcapsule contained in the heat storage composition is the same. Therefore, in a case in which it is desired to reduce the space occupied by the heat storage composition, it is preferable that the heat storage composition does not have a void. From this point, the ratio (void ratio) of the volume of the void in the heat storage composition is preferably 50% by volume or less, more preferably 40% by volume or less, further preferably 20% by volume or less, particularly preferably 15% by volume or less, and most preferably 10% by volume or less. The lower limit is not particularly limited, but 0% by volume can be adopted, for example.

The shape of the heat storage composition is not particularly limited, and may be an amorphous form having fluidity such as a liquid shape or a slurry shape, or may have a shape such as a sheet shape or a granular shape.

In a case in which the heat storage composition is the sheet-shaped, the heat storage composition may have other layers such as a protective layer, a substrate, and an adhesion layer in addition to the layer containing the heat storage material (preferably microcapsule encompassing the heat storage material). In a case in which the sheet-shaped heat storage composition has other layers, the flame retardant may be contained in other layers.

Other layers such as the protective layer, the substrate, and the adhesion layer that may be included in the sheet-shaped heat storage composition will be described in detail in the heat storage member, which will be described below.

[Manufacturing Method of Heat Storage Composition]

A manufacturing method of the heat storage composition is not particularly limited. For example, a liquid heat storage composition (dispersion liquid of the microcapsule) can be produced by mixing the microcapsule encompassing the heat storage material (or the composition corresponding to the core material), the flame retardant, and any component such as the binder used as needed. Further, a sheet-shaped heat storage composition can be produced by applying the dispersion liquid of microcapsule on the substrate and drying the applied dispersion liquid.

Examples of the coating method include a die coating method, an air knife coating method, a roll coating method, a blade coating method, a gravure coating method, and a curtain coating method, and the blade coating method, the gravure coating method, or the curtain coating method is preferable. Further, as an example, there is a method of forming a layer by casting the dispersion liquid containing microcapsule which encompasses the heat storage material and the binder.

In the case of the aqueous solvent, it is preferable that the drying be performed in the range of 60° C. to 130° C.

In a step of drying, a flattening operation may be performed with respect to the layer which contains the microcapsules (for example, the heat storage composition formed of a single layer) by using a roller. Alternatively, the operation of applying pressure to the layer which contains microcapsules (for example, the heat storage composition formed of a single layer) by using a device such as a nip roller, a calender, or the like to increase the filling ratio of a microcapsule in the film may be performed.

Further, in order to reduce the void ratio in the heat storage composition, it is preferable to adopt at least one method selected from the group consisting of using the microcapsule which is easily deformed, performing coating at a temperature equal to or higher than the melting point of the heat storage material encompassed in the microcapsule, performing drying gently in a case in which the layer which contains the microcapsules is formed, and performing coating in a plurality of times without forming a thick coating layer at one time.

One of the suitable embodiments of the manufacturing method of the heat storage composition is a method including a step A of mixing a heat storage material, polyisocyanate, at least one active hydrogen-containing compound selected from the group consisting of polyol and polyamine, and an emulsifier to produce a dispersion liquid containing a microcapsule which encompasses at least a part of the heat storage material, and a step B of producing the heat storage composition by using the dispersion liquid without substantially adding a binder to the dispersion liquid.

According to the method, since the heat storage composition is produced without using the binder, the content of the microcapsule in the heat storage composition can be increased, and as a result, the content of the heat storage material in the heat storage composition can be increased.

That is, the content (encompassing ratio) of the heat storage material which is encompassed in the microcapsule is preferably 95% by mass or more based on the total mass of the heat storage material used in the step A. The upper limit is not particularly limited, but 100% by mass can be adopted, for example.

The description of the material used in the step A (heat storage material, polyisocyanate, at least one active hydrogen-containing compound selected from the group consisting of polyol and polyamine, and the emulsifier) is as described above.

Further, as for the procedure for manufacturing the microcapsule in the step A, the above method can be adopted, for example. As the specific procedure of the step A, it is preferable to perform the step (emulsification step) of dispersing the oil phase containing the heat storage material and the capsule wall material (polyisocyanate and active hydrogen-containing compound) in the water phase containing the emulsifier (more preferably, the water phase containing the emulsifier and the flame retardant) to prepare the emulsified liquid, and the step (capsulizing step) of polymerizing the capsule wall material at the interface between the oil phase and the water phase to form the capsule wall, and forming the dispersion liquid containing the microcapsule which encompasses the heat storage material.

In the procedure of the step B, no binder is substantially added to the dispersion liquid containing the microcapsule produced above. That is, the binder is not substantially added to the dispersion liquid obtained in the step A, and the dispersion liquid is used in producing of the heat storage composition. Here, "without substantially adding the binder" means that the added amount of the binder to the total mass of the microcapsule in the dispersion liquid is 1% by mass or less. Above all, the added amount of the binder is preferably 0.1% by mass or less, and more preferably 0% by mass, based on the total mass of the microcapsule in the dispersion liquid.

In the step B, examples of a procedure for producing the heat storage composition by using the dispersion liquid include, as described above, a procedure for producing the sheet-shaped heat storage composition by applying the liquid on the substrate and drying the coating film.

Suitable embodiments of the procedure of the step B including the method of applying the dispersion liquid and the method of drying the coating film and the manufacturing condition are as described above.

In a case in which the sheet-shaped heat storage composition is manufactured by the manufacturing method including the step A and step B described above, a step of adding the flame retardant may be any one of the step A, the step B, or other steps, but it is preferable that the dispersion liquid prepared in the step A contain the flame retardant, and more preferable that the water phase containing the emulsifier used in the step A further contain the flame retardant.

[Heat Storage Sheet]

As an example of the sheet-shaped heat storage composition, a sheet including the layer containing the heat storage material (preferably the microcapsule encompassing the heat storage material) and the flame retardant (hereinafter, also referred to as a "heat storage sheet") will be described.

The heat storage material and the flame retardant contained in the heat storage sheet, and the composition of the heat storage sheet may be the same as those described for the heat storage composition described above, including the preferred embodiments thereof.

The components such as the binder, the thermal conductive material, the ultraviolet absorbing agent, the antioxidant, and the preservative, which may be contained in the heat storage sheet, may be the same as those described for the heat storage composition described above, including the preferred embodiments thereof.

<Physical Property of Heat Storage Sheet>

The thickness of the heat storage sheet is preferably 1 to 1000 μm, and more preferably 1 to 500 μm. The thickness of the heat storage sheet may be adjusted by the applied amount of the heat storage composition or the formation amount of film, or may be adjusted by adhering a plurality of the heat storage sheets. The thickness of the heat storage sheet is an average value obtained by observing a cut cross section obtained by cutting the heat storage sheet along the thickness direction with a scanning electron microscope (SEM), measuring any 5 points, and averaging the thicknesses of the 5 points.

The latent heat capacity and the void ratio of the heat storage sheet may be the same as those described for the heat storage composition described above, including the preferred embodiments thereof.

Further, a manufacturing method of the heat storage sheet is not particularly limited, and may be the same as that described for the sheet-shaped heat storage composition, including the preferred embodiment thereof.

[Heat Storage Member]

The heat storage member according to the embodiment of the present invention contains the heat storage material and the flame retardant, in which Condition C is satisfied in which the gas generation temperature Tr of the flame retardant obtained by Measuring Method C1 is lower than the gas generation temperature Tc of the specific member obtained by Measuring Method C2.

Here, the "specific member" refers to a member obtained by removing the flame retardant and the specific solvent from the heat storage member.

[Condition C]

<Measuring Method C1>

Measuring Method C1 of obtaining the gas generation temperature Tr of the flame retardant in the heat storage sheet is as follows. Measuring Method C1 is the same as the measuring method A1 described above except that the heat storage member is applied instead of the heat storage composition, and the description of Measuring Method A1 can be incorporated for the detailed embodiment and the preferable embodiment of Measuring Method C1.

First, a type and a content of the flame retardant contained in the heat storage member are identified. Next, a weight change of the flame retardant due to heating is measured by using the TG-DTA. A relational expression, which is represented by Expression (C1), between the temperature T (° C.) and the weight reduction ratio Δma(T) of the flame retardant is derived based on the obtained measurement result.

$$\Delta ma(T)=(ma_0-ma(T))/(ma_0) \quad (C1)$$

In Expression (C1), ma(T) represents a weight of the flame retardant at the temperature T (° C.), and $ma_0$ represents a weight of the flame retardant before heating.

Then, the gas generation temperature Tr (° C.) of the flame retardant is obtained by obtaining a temperature at which the weight reduction ratio Δma(T) of the flame retardant reaches 2% by mass by using Expression (C1).

<Measuring Method C2>

Measuring Method C2 of obtaining the gas generation temperature Tc of the specific member is as follows. Measuring Method C2 is the same as the measuring method A2 described above except that the heat storage member is applied instead of the heat storage composition and the specific member is applied instead of the specific composition, and the description of Measuring Method A2 can be incorporated for the detailed embodiment and the preferable embodiment of Measuring Method C2.

First, a weight change of the heat storage member due to heating is measured by using the TG-DTA.

A relational expression, which is represented by Expression (C2), between the temperature T (° C.) and a weight reduction ratio Δm3(T) of the heat storage member is derived based on the obtained measurement result.

$$\Delta m3(T)=(m3_0-m3(T))/(m3_0) \quad (C2)$$

In Expression (C2), m3(T) represents a weight of the heat storage member at the temperature T (° C.) and $m3_0$ represents a weight of the heat storage member before heating.

In addition, a type and a content of the specific solvent contained in the heat storage member will be identified. As a result of the measurement, in a case in which the heat storage member contains the specific solvent, the weight change of the identified specific solvent due to heating is measured by using the TG-DTA.

A relational expression, which is represented by Expression (C3), between the temperature T (° C.) and a weight reduction ratio Δmb(T) of the specific solvent is derived based on the obtained measurement result.

$$\Delta mb(T)=(mb_0-mb(T))/(mb_0) \quad (C3)$$

In Expression (C3), mb(T) represents a weight of the specific solvent at the temperature T (° C.) and $mb_0$ represents a weight of the specific solvent before heating.

Then, a relational expression, which is represented by Expression (C4), between the temperature T (° C.) and a weight reduction ratio Δmz(T) of the specific member obtained by removing the flame retardant and the specific solvent from the heat storage member is derived.

$$\Delta mz(T)=(100*\Delta m3(T)-a*\Delta ma(T)-b*\Delta mb(T))/(100-a-b) \quad (C4)$$

In Expression (C4), a represents a ratio (% by mass) of the content of the flame retardant (in a case in which two or more flame retardants are present, the total content thereof) to the total mass of the heat storage member. b represents a ratio (% by mass) of the content of the specific solvent (in a case in which two or more specific solvents are present, the total content thereof) to the total mass of the heat storage member. Δma(T) represents the weight reduction ratio of the flame retardant obtained by Measuring Method C1.

A temperature at which the weight reduction ratio Δmz(T) of the specific member reaches 2% by mass is obtained by using Expression (C4), and the obtained temperature is defined as the gas generation temperature Tc (° C.) of the specific member.

As a result of comparison between the gas generation temperature Tr of the flame retardant obtained by Measuring Method C1 and the gas generation temperature Tc of the specific member obtained by Measuring Method C2, in a case in which the gas generation temperature Tr of the flame retardant is lower than the gas generation temperature Tc of the specific member (TC−Tr>0), the heat storage sheet satisfies Condition C.

The reason why the slow flame retardance and the ignition resistance of the heat storage member satisfying Condition C is improved is the same as the reason why the slow flame retardance and the ignition resistance of the heat storage composition satisfying Condition A is improved.

Further, the gas generation temperature Tr of the flame retardant and the gas generation temperature Tc of the specific member in the heat storage member, and the content of the low molecular weight compound in the heat storage member are the same as those described for the heat storage composition described above, including the preferred embodiments thereof.

Hereinafter, the configuration of the heat storage member will be described for each layer.

[Heat Storage Layer]

The heat storage material included in the heat storage layer included the heat storage member and the flame retardant in a case in which the heat storage layer contains the flame retardant may be the same as those described for the heat storage composition described above, including the preferred embodiments thereof.

Further, the components such as the binder, the thermal conductive material, the ultraviolet absorbing agent, the antioxidant, and the preservative, which may be contained in the heat storage layer, may be the same as those described for the heat storage composition described above, including the preferred embodiments thereof.

Further, the physical property and a manufacturing method of the heat storage layer may be the same as those described for the heat storage sheet described above, including the preferred embodiments thereof.

From the viewpoint of the amount of heat storage, the thickness of the heat storage layer in the heat storage member to the entire thickness of the heat storage member is preferably 50% or more, more preferably 70% or more, further preferably 80% or more, and particularly preferably 90% or more. Further, the upper limit of the thickness of the heat storage layer in the heat storage member is preferably 99.9% or less, and more preferably 99% or less.

[Protective Layer]

The heat storage member may have the protective layer. The protective layer is a layer that is disposed on the heat storage layer and has a function of protecting the heat storage layer. The protective layer can prevent scratches and folding in the process of manufacturing the heat storage member, and impart handleability. In a case in which the heat storage member includes the substrate, in many cases, the protective layer is disposed on the surface side of the heat storage layer opposite to the substrate.

It is preferable that the protective layer be disposed on the outermost layer of the heat storage member. Here, "the protective layer is disposed on the outermost layer" of the heat storage member means that the protective layer is disposed on any of both ends of a stacked body which configures the heat storage member in a stacking direction. Further, another layer may be provided on a surface of the protective layer opposite to a surface thereof facing the heat storage layer.

The protective layer may be disposed so as to be in contact with the heat storage layer, or may be disposed on the heat storage layer via another layer. It is preferable that the protective layer be disposed so as to be in contact with at least one surface of the heat storage layer to manufacture the heat storage member in which the heat storage layer and the protective layer are in contact with each other.

Examples of the embodiment in which the heat storage member has the protective layer include an embodiment in which at least one of the heat storage layer or the protective layer contains the flame retardant, and more specifically, an embodiment in which the heat storage layer contains the flame retardant and the protective layer does not contain the flame retardant, an embodiment in which the protective layer contains the flame retardant and the heat storage layer does not contain the flame retardant, and an embodiment in which both the heat storage layer and the protective layer contain the flame retardant.

The protective layer may contain the flame retardant, and from the viewpoint of being more excellent in the heat storage property of the heat storage member, it is preferable that the protective layer contain the flame retardant, and more preferable that only the protective layer contain the flame retardant. Further, it is also preferable that both the heat storage layer and the protective layer contain the flame retardant. In this case, it is preferable that the amount of the flame retardant contained in the protective layer be larger than the amount of the flame retardant contained in the heat storage layer, and more preferable that the amount of the flame retardant contained in the heat storage layer be half or less of the amount of the flame retardant contained in the protective layer. The flame retardance can be improved while maintaining a high heat absorption amount by containing a larger amount of the flame retardant in the protective layer. The embodiment of the flame retardant contained in the protective layer is as described above, including the preferred embodiment thereof.

From the viewpoint of being more excellent in the flame retardance, the content of the flame retardant in the protective layer to the total mass of the protective layer is preferably 0.05% by mass or more, more preferably 0.1% by mass or more, further preferably 1% by mass or more, and particularly preferably 5% by mass or more. The upper limit is not particularly limited, but from the viewpoint of being more excellent in the amount of heat storage of the heat storage member, it is preferably 50% by mass or less, more preferably 40% by mass or less, further preferably 30% by mass or less, and particularly preferably 10% by mass or less.

The protective layer may contain, as the flame retardant, an inorganic particle such as silica. The amount and type of the inorganic particle can be adjusted depending on the surface shape and/or film quality. The size of the inorganic particle is preferably 0.01 to 1 μm, more preferably 0.05 to 0.2 μm, and further preferably 0.1 to 0.1 μm. The content of the inorganic particles to the total mass of the protective layer is preferably 0.1% to 50% by mass, and more preferably 1% to 40% by mass.

It is also preferable that the protective layer contain an auxiliary flame retardant in combination with the flame retardant. Examples of the auxiliary flame retardant include pentaerythritol, phosphorous acid, and 22-oxidized tetrazinc 12-boron heptahydrate.

It is preferable that the protective layer have a crosslinking structure from the viewpoint of being more excellent in the slow flame retardance and the ignition resistance of the heat storage member. In the present specification, the term "crosslinking structure" refers to a mesh structure formed by crosslinking.

Although the reason why the protective layer has the crosslinking structure to further improve the slow flame retardance and the ignition resistance of the heat storage member is not clear, it is presumed that leaking out of the combustible gas generated by the decomposition of the heat storage material contained in the heat storage layer to the outside can be suppressed.

The presence or absence of the crosslinking structure in the protective layer of the heat storage member can be evaluated by the following method.

First, the heat storage member is cut out in the stacking direction to produce a sample having a size of 2 cm square. The obtained sample is immersed in 50 ml of water and stirred with a stirrer for 10 minutes, and the sample is extracted. The water solubility of the protective layer is evaluated by visually confirming whether or not the protective layer remains on the surface of the extracted sample.

Next, the heat storage member is cut out in the stacking direction to produce a sample having a size of 2 cm square. The obtained sample is immersed in 50 ml of N,N-dimethylformamide (DMF) and stirred with a stirrer for 10 minutes, and the sample is extracted. The solvent solubility of the protective layer is evaluated by visually confirming whether or not the protective layer remains on the surface of the extracted sample.

As a result of the above test, in a case in which the protective layer remains without almost being dissolved in either water or DMF, it is evaluated that the protective layer of the heat storage member has the crosslinking structure.

The material which configures the protective layer is not particularly limited as long as the material can form the crosslinking structure, and resin is preferable, and resin selected from the group consisting of a resin containing a fluorine atom (hereinafter, also referred to as "fluororesin") and a siloxane resin is more preferable from the viewpoint of further improving water resistance and flame retardance.

The forming method of the crosslinking structure in the protective layer is not particularly limited, and a resin having the crosslinking structure formed by a known method can be used as a material which configures the protective layer.

For example, in a case in which a fluororesin is used, the crosslinking structure can be formed in the fluororesin by a crosslinking method in which a fluororesin having a structure including a reactive group such as a hydroxyl group and an amide group is used, a crosslinking agent having a substituent that reacts with the fluororesin is mixed and caused to react with the fluororesin.

Further, in the case of a siloxane resin, a siloxane resin having the crosslinking structure can be produced by hydrolyzing and condensing by using a compound which has 3 or more hydrolyzable groups as a compound represented by Formula (1), which will be described below.

Examples of the fluororesin include a known fluororesin. Examples of the fluororesin include polytetrafluoroethylene, polyvinyl fluoride, polyvinylidene fluoride, polychlorotrifluoroethylene, and polytetrafluoropropylene.

The fluororesin may be a homopolymer obtained by polymerizing the fluorine-containing monomer alone, or may be a copolymer obtained by copolymerizing two or more types of fluorine-containing monomers. Further, the fluororesin may be a copolymer of these fluorine-containing monomer and a monomer other than the fluorine-containing monomer.

Examples of the copolymer include a copolymer of tetrafluoroethylene and tetrafluoropropylene, a copolymer of tetrafluoroethylene and vinylidene fluoride, a copolymer of tetrafluoroethylene and ethylene, a copolymer of tetrafluoroethylene and propylene, a copolymer of tetrafluoroethylene and vinyl ether, a copolymer of tetrafluoroethylene and perfluorovinyl ether, a copolymer of chlorotrifluoroethylene and vinyl ether, and a copolymer of chlorotrifluoroethylene and perfluorovinyl ether.

Examples of the fluororesin include Obbligato (registered trademark) SW0011F (manufactured by AGC COAT-TECH Co., Ltd.); SIFCLEAR-F101 and F102 (manufactured by JSR Corporation); KYNAR AQUATEC (registered trademark) ARC and FMA-12 (both manufactured by Arkema).

The siloxane resin is a polymer which has a repeating unit having a siloxane skeleton, and a hydrolysis condensate of a compound represented by Formula (1) as follows is preferable.

$$Si(X)_n(R)_{4-n} \quad \text{Formula (1)}$$

X indicates a hydrolyzable group. Examples of the hydrolyzable group include an alkoxy group, a halogen group, an acetoxy group, and an isocyanate group.

R indicates a non-hydrolyzable group. Examples of the non-hydrolyzable group include an alkyl group (for example, a methyl group, an ethyl group, and a propyl group), an aryl group (for example, a phenyl group, a tolyl group, and a mesityl group), an alkenyl group (for example, a vinyl group and an allyl group), haloalkyl group (for example, a γ-chloropropyl group), an aminoalkyl group (for example, a γ-aminopropyl group and γ-(2-aminoethyl) aminopropyl group), an epoxy alkyl group (for example, a γ-glycidoxypropyl group and a β-(3,4-epoxycyclohexyl) ethyl group), a γ-mercapto alkyl group, a (meth)acryloyloxyalkyl group (a γ-methacryloyloxypropyl group), and a hydroxyalkyl group (for example, a γ-hydroxypropyl group).

n indicates an integer of 1 to 4, and is preferably 3 or 4.

The hydrolysis condensate described above is intended to be a compound obtained by hydrolyzing the hydrolyzable group in the compound represented by Formula (1) and condensing the obtained hydrolyzate. The hydrolysis condensate described above may be a condensate in which all of the hydrolyzable groups are hydrolyzed, and all of the hydrolyzates are condensed (full hydrolysis condensate), or may be a condensate in which a part of the hydrolyzable group is hydrolyzed, and a part of the hydrolyzate is condensed (partial hydrolysis condensate). That is, the hydrolysis condensate may be a full hydrolysis condensate, a partial hydrolysis condensate, or a mixture thereof.

In a case in which the protective layer contains the siloxane resin, from the viewpoint of further suppressing the fissuring on the surface, it is preferable that the siloxane resin be the hydrolysis condensate obtained by hydrolyzing a mixture obtained by mixing two or more types of compounds represented by Formula (1).

The ratio of the usage amount of two or more types of the compounds represented by Formula (1) is not particularly limited, but the ratio of the amount of the most abundant compound to the amount of the second most abundant compound is preferably 100/1 or less, and more preferably 20/1 or less. The lower limit value is not particularly limited and need only be 1/1 or more.

As the protective layer, for example, a layer which contains a known hard coating agent or a hard coating film as disclosed in JP2018-202696A, JP2018-183877A, and JP2018-111793A may be used. Also, from the viewpoint of the heat storage property, the protective layer which contains a polymer having the heat storage property as disclosed in WO2018/207387A and JP2007-031610A may be used.

The protective layer may contain components other than the resin. Examples of other components include a curing agent, a viscosity adjuster (viscosity improver), a thermal conductive material, an ultraviolet absorbing agent, an antioxidant, and a preservative.

It is preferable that the protective layer have the flexibility which is hard to be fissured and a hard coat property which is hard to be scratched. From these points, it is preferable that the protective layer contain at least the curing agent, the crosslinking agent, or a thermal initiator, or a photoinitiator. Further, it is more preferable that the protective layer contain the curing agent from the viewpoint of being more excellent in the ignition resistance. By containing the curing agent in the protective layer, a dense protective layer having a high crosslink density can be formed.

Examples of the curing agent contained in the protective layer include a reactive monomer, oligomer, and polymer which is cured by heat or radiation (for example, an acrylic resin, an urethane resin, and rubber). As the curing agent, a curing agent that reacts with the resin of the protective layer described above is preferably contained, and examples thereof include a melamine compound, an oxazoline compound, an epoxy compound, an isocyanate compound, a carbodiimide compound, and a silane coupling compound. These curing agents may be used in combination of two types or more. Any polymerizable monomer may be contained in a coating liquid as a component that is cured together with these curing agents.

The content of the curing agent in the protective layer to the total mass of the protective layer is preferably 5% to 50% by mass, and more preferably 10% to 40% by mass.

It is preferable that the protective layer contain the viscosity adjuster from the viewpoint of being excellent in the ignition resistance. The reason why the ignition resistance of the heat storage member is improved by containing the viscosity adjuster in the protective layer is not clear, but it is presumed that a minute gap with the adjacent layer such as the heat storage layer can be filled to suppress leaking out of the combustible gas leaks to the outside.

The viscosity adjuster contained in the protective layer is not particularly limited as long as it is a known viscosity adjuster, but the water-soluble polymer or cellulose described as the binder that may be contained in the heat storage composition is preferable, and polyvinyl alcohol or carboxymethyl cellulose (CMC) is more preferable.

As the polyvinyl alcohol contained in the protective layer, a commercially available product on the market may be used, and examples thereof include Denka Poval series manufactured by Denka Company Limited (for example, Denka Poval B-24 and B-33) and Kuraray Poval series manufactured by Kuraray Co., Ltd. (for example, Kuraray Poval PVA-217E, Kuraray Poval KL-318, or the like).

In a case in which the viscosity adjuster is polyvinyl alcohol, the degree of polymerization of polyvinyl alcohol is preferably 500 to 5000 and more preferably 1000 to 3000.

The content of the viscosity adjuster in the protective layer to the total mass of the protective layer is preferably 5% to 50% by mass, and more preferably 10% to 40% by mass.

The thickness of the protective layer is not particularly limited, but is preferably 50 μm or less, more preferably 25 μm or less, further preferably 15 μm or less, and particularly preferably 10 μm or less from the viewpoint of being more excellent in the heat storage property and fissuring characteristic of the heat storage member. The lower limit value is not particularly limited, but is preferably 0.1 μm or more, more preferably 1 μm or more, and further preferably more than 3 μm from the viewpoint of being more excellent in the flame retardance of the heat storage member.

Further, from the viewpoint of being excellent in the heat storage property of the heat storage member, the ratio of the thickness of the protective layer to the thickness of the heat storage layer is preferably 1/10 or less, more preferably 1/20 or less, and further preferably 1/40 or less. The lower limit value is not particularly limited, but is preferably 1/1000 or more, and more preferably 1/200 or more from the viewpoint of being more excellent in the flame retardance of the heat storage member. By setting the thicknesses of the heat storage layer and the protective layer within the above range, it is possible to obtain excellent slow flame retardance and ignition resistance while maintaining a high heat absorption amount.

The thickness of the protective layer is an average value obtained by observing the cut cross section of the protective layer cut in parallel to the thickness direction with SEM, measuring any 5 points, and averaging the thicknesses of the 5 points.

It is preferable that no fissuring be present on the surface of the protective layer opposite to the surface thereof facing the heat storage layer. Here, "no fissuring is present" refers to a state in which no fissuring can be observed in a case in which the surface of the protective layer is observed by using SEM at a magnification of 200 times. The fissuring characteristic of the protective layer can be adjusted by adjusting the ratio of crosslinking in the protective layer based on the amount of curing agent and the number of crosslinking points of the polymer precursor to be cured. Further, the occurrence of fissuring can be suppressed by thinning the film thickness of the protective layer. By forming a flexible protective layer in which no fissuring is present, the heat storage member can be applied to the roll type.

The forming method of the protective layer is not particularly limited, and a known method can be adopted. For example, there are a method in which the composition for forming the protective layer including a resin or a precursor thereof is brought into contact with the heat storage layer, and the coating film is formed on the heat storage layer, and a curing treatment is performed on the coating film as needed, and a method of adhering the protective layer to the heat storage layer.

The resin contained in the composition for forming the protective layer is as above. Examples of the composition for forming the protective layer include a composition containing at least one selected from the group consisting of a resin containing a fluorine atom and a siloxane resin or a precursor thereof.

The precursor of the resin refers to a component that becomes a resin by curing treatment, and examples thereof include a compound represented by Formula (1) above.

The composition for forming the protective layer may contain the solvent (for example, water and an organic solvent), as needed. It is preferable that the composition for forming the protective layer contain a flame retardant.

The method in which the composition for forming the protective layer is brought into contact with the heat storage layer is not particularly limited, and for example, there are a method of applying the composition for forming the protective layer on the heat storage layer, a method of immersing the heat storage layer in the composition for forming the protective layer, and a method of applying the composition for forming the protective layer containing the viscosity adjuster as the binder on the heat storage layer to form the coating film.

In the method of applying the composition for forming the protective layer containing the viscosity adjuster (binder) to form the coating film, it is preferable that the composition for forming the protective layer further contain the solvent. In a case in which the composition for forming the protective layer contains the solvent, it is preferable to perform the drying step after forming the coating film to volatilize the solvent from the coating film. Further, from the viewpoint of improving the coatability, the composition for forming the protective layer which contains the viscosity adjuster (binder) may further contain additives such as the surfactant.

Examples of the method of applying the composition for forming the protective layer include a method of using a known coating device such as a dip coater, a die coater, a slit coater, a bar coater, an extrusion coater, a curtain flow coater, spray coating, and the like, and a printing device such as gravure printing, screen printing, offset printing, inkjet printing, and the like.

[Other Layers]

The heat storage member may include a layer other than the heat storage layer and the protective layer.

<Substrate>

The heat storage member may further include the substrate, and preferably further includes the substrate.

Examples of the substrate include a resin substrate such as polyester (for example, polyethylene terephthalate and polyethylene naphthalate), polyolefin (for example, polyethylene and polypropylene), and polyurethane, a glass substrate, and a metal substrate. It is also preferable to add a function of improving the thermal conductivity in a plane direction or a film thickness direction and quickly diffusing heat from a heat generating portion to a heat storage portion to the substrate. In that case, it is also preferable to combine the metal substrate and the thermal conductive material such as a graphene sheet as the substrate.

The thickness of the substrate is not particularly limited, and can be appropriately selected depending on the purpose and the case. It is preferable the thickness of the substrate be thick from the viewpoint of the handleability, and it is preferable that the thickness be thin from the viewpoint of the amount of heat storage (content of the microcapsule in the heat storage layer).

The thickness of the substrate is preferably 1 to 100 μm, more preferably 1 to 25 μm, and further preferably 3 to 15 μm.

It is preferable that a surface of the substrate be subjected to surface treatment of the substrate for a purpose of improving the adhesiveness to the heat storage layer. Examples of a surface treatment method include a method such as corona treatment, plasma treatment, providing of a thin layer which is an easy adhesion layer, and the like.

The easy adhesion layer has hydrophilicity-hydrophobicity and affinity with the materials of both the heat storage layer and the substrate, and preferably has adhesiveness. The preferable material which configures the easy adhesion layer differs depending on the material of the heat storage layer.

The material which configures the easy adhesion layer is not particularly limited, but styrene-butadiene rubber, an urethane resin, an acrylic resin, a silicone resin, or a polyvinyl resin is preferable. In a case in which the substrate includes polyethylene terephthalate (PET), and the heat storage layer contains at least one selected from the group consisting of polyurethane, polyurea, polyurethane, polyurea, and polyvinyl alcohol, in some cases, for example, styrene-butadiene rubber or an urethane resin is preferably used as the material which configures the easy adhesion layer.

From the viewpoint of the film hardness and adhesiveness, it is preferable that the crosslinking agent be introduced into the easy adhesion layer. It is considered that an appropriate amount of the crosslinking agent is present to prevent the film itself from aggregation breaking to be easily peeled off, and to prevent the film from being too hard from the viewpoint of the adhesiveness. As the crosslinking agent, the same agent as the curing agent described above is preferably used.

The easy adhesion layer may include two or more types of materials including a material that easily adheres to the substrate and a material that easily adheres to the heat storage layer. Further, the easy adhesion layer may be a stacked body of two or more layers including a layer that easily adheres to the substrate and a layer that easily adheres to the heat storage layer.

It is preferable that the thickness of the easy adhesion layer be thick from the viewpoint of adhesiveness, but in a case in which the easy adhesion layer is too thick, the amount of heat storage of the heat storage member as a whole is decreased. Therefore, the thickness of the easy adhesion layer is preferably 0.1 to 5 μm, and more preferably 0.5 to 2 μm.

<Adhesion Layer>

The adhesion layer may be provided on the side of the substrate opposite to the side provided with the heat storage layer.

The adhesion layer is not particularly limited, and can be appropriately selected depending on the intended purpose, and examples thereof include a layer which contains a known pressure sensitive adhesive (also referred to as a pressure-sensitive adhesive layer) or a layer which contains an adhesive (also referred to as an adhesive layer).

Examples of the pressure sensitive adhesive include an acrylic pressure sensitive adhesive, a rubber-based pressure sensitive adhesive, and a silicone-based pressure sensitive adhesive. Further, examples of the pressure sensitive adhesive also include the acrylic pressure sensitive adhesive, the ultraviolet (UV) curing pressure sensitive adhesive, the silicone pressure sensitive adhesive described in "Characteristic evaluation of peeling paper/peeling film and pressure sensitive adhesive tape and its control technology", published by Johokiko Co., Ltd., 2004, Chapter 2.

The acrylic pressure sensitive adhesive refers to a pressure sensitive adhesive containing a polymer ((meth)acrylic polymer) of a (meth)acrylic monomer.

Also, the pressure-sensitive adhesive layer may contain a viscosity imparting agent.

Examples of the adhesive include an urethane resin adhesive, a polyester adhesive, an acrylic resin adhesive, an ethylene vinyl acetate resin adhesive, a polyvinyl alcohol adhesive, a polyamide adhesive, and a silicone adhesive. From the viewpoint of the higher adhesive strength, the urethane resin adhesive or the silicone adhesive is preferable.

The forming method of the adhesion layer is not particularly limited, and examples thereof include a forming method of transferring the adhesion layer onto the substrate, and a forming method of applying a composition containing the pressure sensitive adhesive or the adhesive onto the substrate.

From the viewpoint of the pressure sensitive adhesive strength, handleability, and the amount of heat storage, the thickness of the adhesion layer is preferably 0.5 to 100 μm, more preferably 1 to 25 μm, and further preferably 1 to 15 μm.

A peeling sheet may adhere to a surface of the adhesion layer opposite to a side facing the substrate. Since the peeling sheet adheres, for example, in a case in which the microcapsule dispersion liquid is applied on the substrate, the handleability in a case of the thin thicknesses of the substrate and the adhesion layer can be improved.

The peeling sheet is not particularly limited, and for example, a peeling sheet in which a peeling material, such as silicone, is attached on a support, such as PET or polypropylene, can be suitably used.

[Physical Property of Heat Storage Member]

<Latent Heat Capacity>

From the viewpoints of the high heat storage property and suitability for temperature control of a heat generating body which generates heat, the latent heat capacity of the heat storage member is preferably 105 J/ml or more, more preferably 120 J/ml or more, and further preferably 130 J/ml or more. The upper limit is not particularly limited, but is 400 J/ml or less in many cases.

The latent heat capacity is a value calculated from the result of the differential scanning calorimetry (DSC) and the thickness of the heat storage member.

From the viewpoint of exhibiting a high amount of heat storage in a limited space, the amount of heat storage from in a unit of "J/ml (amount of heat storage per unit volume)" is appropriate, but in a case of the applications to the electronic device, the weight of the electronic device is also important. Therefore, from the viewpoint of exhibiting a high heat storage property in a limited mass, the amount of heat storage in a unit of "J/g (amount of heat storage per unit weight)" may be appropriate. In this case, the latent heat capacity of the heat storage member is preferably 120 J/g or more, more preferably 140 J/g or more, further preferably 150 J/g or more, and particularly preferably 160 J/g or more. The upper limit is not particularly limited, but it is 450 J/g or less in many cases.

<Tensile Breaking Elongation>

From the viewpoint of being capable of providing the heat storage member as a roll type, it is preferable that the tensile strength of the heat storage member and the elongation ratio at the time of tensile breaking be large. The elongation ratio at the time of tensile breaking is preferably 10% or more, more preferably 20% or more, and further preferably 30% or more. The upper limit is not particularly limited, but is 500% or less in many cases. The tensile strength is preferably 1 MPa or more, more preferably 5 MPa or more, and further preferably 10 MPa or more. The upper limit is not particularly limited, but is 100 MPa or less in many cases, and preferably 50 MPa or less.

The tensile strength of the heat storage member and the elongation ratio at the time of tensile breaking are measured according to the method described in JIS K6251. Specifically, the heat storage sheet is cut out into a dumbbell-shaped No. 2 type, and a test piece with two marked lines is produced with an initial distance between marked lines of 20 mm. This test piece is attached to a tensile tester and pulled at a speed of 200 mm/min to breaking. At this time, the maximum force (N) until breaking and the distance (mm) between marked lines at the time of breaking are measured, and the tensile strength and the elongation ratio at the time of tensile breaking are calculated by the following equation.

The tensile strength TS (MPa) is calculated by the following equation.

$$TS = Fm/Wt$$

Fm: maximum force (N)
W: width of parallel portion (mm)
t: thickness of parallel portion (mm)

The elongation ratio Eb (%) at the time of tensile breaking is calculated by the following equation.

$$Eb = (Lb - L0)/L0 \times 100$$

Lb: distance (mm) between marked lines at the time of breaking
L0: initial distance (mm) between marked lines

[Electronic Device]

The electronic device includes the heat storage composition described above, the heat storage sheet described above, and/or the heat storage member described above.

The electronic device may include a member other than the heat storage composition, the heat storage sheet, and the heat storage member. Examples of other members include the heat generating body, a thermally conductive material, a heat pipe, a vapor chamber, the adhesive, and the substrate. The electronic device preferably includes at least one of the heat generating body or the thermally conductive material, and more preferably include the heat generating body.

One of the suitable embodiments of the electronic device is an embodiment including the heat storage sheet or the heat storage member, the thermally conductive material which is disposed on the heat storage sheet or the heat storage member, and the heat generating body which is disposed on the surface side of the thermally conductive material opposite to the heat storage sheet or the heat storage member.

The heat storage composition, the heat storage sheet, and the heat storage member included in the electronic device are as described above.

[Heat Generating Body]

The heat generating body is a member which may generate heat, which is included in the electronic device, and is, for example, systems on a chip (SoC) such as a central processing unit (CPU), a graphics processing unit (GPU), a static random access memory (SRAM), and a radio frequency (RF) device, a camera, a LED package, power electronics, and a battery (in particular, lithium-ion secondary battery).

The heat generating body may be disposed so as to be in contact with the heat storage member, or may be disposed on the heat storage member via another layer (for example, the thermally conductive material which will be described below).

[Thermally Conductive Material]

It is preferable that the electronic device further include the thermally conductive material.

The thermally conductive material refers to a material which has a function of conducting heat which is generated from the heat generating body to another medium.

The "thermal conductivity" of the thermally conductive material refers to a material having the thermal conductivity of 10 $Wm^{-1}K^{-1}$ or more. The thermal conductivity (unit: $Wm^{-1}K^{-1}$) is a value measured by a flash method at a temperature of 25° C. by a method compliant with Japanese Industrial Standards (JIS) R1611.

Examples of the thermally conductive material include the metal plate, the heat dissipation sheet, and silicone grease, and the metal plate or the heat dissipation sheet is preferable.

It is preferable that the electronic device include the heat storage member described above, the thermally conductive material which is disposed on the heat storage member, and the heat generating body which is disposed on the surface side of the thermally conductive material opposite to the heat storage member. Further, it is more preferable that the electronic device include the heat storage member described above, the metal plate which is disposed on the heat storage member, and the heat generating body which is disposed on the surface side of the metal plate opposite to the heat storage member.

In a case in which the heat storage member described above includes the protective layer, one of the suitable embodiments of the electronic device is an embodiment including the heat storage member described above, a metal plate which is disposed on a surface side of the heat storage member opposite to the protective layer, and the heat generating body which is disposed on a surface side of the metal plate opposite to the heat storage member. Stated another way, it is preferable that the protective layer, the heat storage layer, the metal plate, and the heat generating body be stacked in this order.

<Heat Dissipation Sheet>

The heat dissipation sheet is a sheet which has a function of conducting heat which is generated from the heat generating body to another medium, and it is preferable that a heat dissipation material be provided. Examples of the heat dissipation material include carbon, metal (for example, silver, copper, aluminum, iron, platinum, stainless steel, nickel, and the like), and silicon.

Examples of the heat dissipation sheet include a copper foil sheet, a metal plate, a metal coating film resin sheet, a metal-containing resin sheet, and a graphene sheet, and the graphene sheet is preferable. The thickness of the heat dissipation sheet is not particularly limited, but it is preferably 10 to 500 μm, and more preferably 20 to 300 μm.

[Heat Pipe, Vapor Chamber]

The electronic device may further include a heat transport member selected from the group consisting of the heat pipe and the vapor chamber.

Both the heat pipe and the vapor chamber are formed of the metal, and comprise at least a member which has a hollow structure and a working fluid which is a heat transfer medium enclosed in the internal space, in which the working fluid evaporates (vaporizes) in a high temperature portion (evaporation portion) to absorb heat, and the vaporized working fluid is condensed in a low temperature portion (condensing portion) to dissipate heat. The heat pipe and the vapor chamber have a function of transporting heat from a member in contact with the high temperature portion to a member in contact with the low temperature portion due to a phase change of the working fluid inside.

In a case in which the electronic device includes the heat storage member and the heat transport member selected from the group consisting of the heat pipe and the vapor chamber, it is preferable that the heat storage member and the heat pipe or the vapor chamber be in contact with each other, and it is more preferable that the heat storage member be in contact with the low temperature portion of the heat pipe or the vapor chamber.

Further, in a case in which the electronic device includes the heat storage member and the heat transport member selected from the group consisting of the heat pipe and the vapor chamber, it is preferable that the phase change temperature of the heat storage material included in the heat storage layer, and the temperature range in which the heat pipe or the vapor chamber is operated be overlapped. The temperature range in which the heat pipe or the vapor chamber is operated includes, for example, the temperature range in which the working fluid can change a phase in each inside.

The materials which configure the heat pipe and the vapor chamber are not particularly limited as long as it is a material which has high thermal conductivity, and examples thereof include a metal such as copper and aluminum.

Examples of the working fluid enclosed in the internal space of the heat pipe and the vapor chamber include water, methanol, ethanol, and CFC substitutes, which are appropriately selected and used depending on the temperature range of the applied electronic device.

[Other Members]

The electronic device may include members other than the protective layer, the heat storage layer, the metal plate, and the heat generating body. Examples of other members include the heat dissipation sheet, the substrate, and the adhesion layer. The substrate and the adhesion layer are as described as the substrate and the adhesion layer that may be included in the heat storage member.

The electronic device may include at least one member selected from the group consisting of the heat dissipation sheet, the substrate, and the adhesion layer between the heat storage layer and the metal plate. In a case in which two or more members among the heat dissipation sheet, the substrate, and the adhesion layer are disposed between the heat storage layer and the metal plate, the substrate, the adhesion layer, and the heat dissipation sheet are preferably disposed in this order from the heat storage layer side toward the metal plate side.

Further, the electronic device may have the heat dissipation sheet between the metal plate and the heat generating body.

EXAMPLES

Hereinafter, the present invention will be described more specifically with reference to Examples. However, the present invention is not limited to the following Examples as long as the gist of the present invention is not exceeded. Unless otherwise noted, "parts" and "%" are based on mass.

The particle diameter D50 and a wall thickness of the microcapsule were measured by the method described above.

Example 1

(Preparation of Composition for Forming Heat Storage Layer)

A solution A1 to which 120 parts by mass of ethyl acetate were added was obtained by heating and dissolving 72 parts by mass of icosane (latent heat storage material; an aliphatic hydrocarbon having a melting point of 37° C. and 20 carbon atoms) at 60° C.

A solution B1 was obtained by adding 0.05 parts by mass of N,N,N',N'-tetrakis(2-hydroxypropyl)ethylenediamine (Adeka Polyether EDP-300, manufactured by ADEKA CORPORATION) to the solution A1 being stirred.

A solution C1 was obtained by adding 4 parts by mass of trimethylolpropane adduct (Burnock D-750, manufactured by DIC Corporation) of tolylene diisocyanate dissolved in 1 part by mass of methyl ethyl ketone to the solution B1 being stirred.

The solution C1 was added to a solution obtained by dissolving 7.4 parts by mass of polyvinyl alcohol (Kuraray Poval (registered trademark) KL-318 (manufactured by Kuraray Co., Ltd.; polyvinyl alcohol (PVA)) as the emulsifier in 140 parts by mass of water, and the mixture was emulsified and dispersed to obtain an emulsified liquid D1. 250 parts by mass of water were added to the emulsified liquid D1, the mixture was heated to 70° C. while stirring the obtained liquid, and then cooled to 30° C. after continuing stirring for 1 hour. Water was further added to the cooled liquid to adjust the concentration, and an icosane encompassing microcapsule dispersion liquid which has a polyurethane urea capsule wall was obtained.

A concentration of solid contents of the icosane encompassing microcapsule dispersion liquid was 14% by mass.

The mass of the capsule wall of the icosane encompassing microcapsule to the mass of the encompassed icosane was 6% by mass.

The volume-based median diameter D50 of the microcapsule was 20 μm. The thickness δ of the capsule wall of the microcapsule was 0.1 μm.

A composition 1 for forming the heat storage layer was prepared by adding and mixing 1.5 parts by mass of a side chain alkylbenzene sulfonic acid amine salt (NEOGEN T, manufactured by DKS Co., Ltd.), 0.15 parts by mass of 1,2-bis(3,3,4,4,5,5,6,6,6-nonafluorohexyloxycarbonyl) sodium ethanesulfonate (W-AHE, manufactured by FUJIFILM Corporation), and 0.15 parts by mass of polyoxyalkylene alkyl ether (Noigen LP-90, manufactured by DKS Co., Ltd.) to 1000 parts by mass of the obtained microcapsule dispersion liquid.

(Manufacturing of Polyethylene Terephthalate (PET) Substrate (1) with Easy Adhesion Layer and Pressure-Sensitive Adhesive Layer)

An optical pressure sensitive adhesive sheet MO-3015 (thickness: 5 μm) manufactured by LINTEC Corporation was attached to the PET substrate which has a thickness of 6 μm to form the pressure-sensitive adhesive layer.

An aqueous solution in which Nipol Latex LX407C4E (manufactured by Zeon Corporation), Nipol Latex LX407C4C (manufactured by Zeon Corporation), and Aquabrid EM-13 (manufactured by Daicel Fine Chem Ltd.) were mixed and dissolved such that the concentration of solid contents was 22:77.5:0.5 (mass-based) was applied on the surface of the PET substrate opposite to the surface provided with the pressure-sensitive adhesive layer. The obtained coating film was dried at 115° C. for 2 minutes to form the easy adhesion layer formed of a styrene-butadiene rubber resin which has a thickness of 1.3 μm and manufacture a PET substrate (1) with the easy adhesion layer and the pressure-sensitive adhesive layer.

(Preparation of Composition 1 for Forming Protective Layer)

The following components were mixed and the mixed solution was stirred for 12 hours to prepare a composition 1 for forming the protective layer.

- 12.4 parts by mass of KYNAR Aquatec ARC (manufactured by Arkema, 44% by mass of concentration of solid contents; a fluororesin)
- 10.9 parts by mass of Epocros WS-700 (manufactured by Nippon Shokubai Co., Ltd., 25% by mass of concentration of solid contents; an oxazoline-based curing agent)
- 17.0 parts by mass of FUJI JET BLACK B-15 (manufactured by Fuji Pigment Co., Ltd., 15% by mass of concentration of solid contents, carbon black)
- 5.1 parts by mass of Taien N (manufactured by Taihei Chemical Industrial Co., Ltd., aqueous dispersion liquid containing diammonium hydrogen phosphate and ammonium dihydrogen phosphate at a concentration of solid contents of 20% by mass; a flame retardant)
- 1.4 parts by mass of Noigen LP-70 (manufactured by DKS Co., Ltd., an aqueous solution with 2% by mass of a concentration of solid contents; surfactant)
- 1.4 parts by mass of W-AHE (manufactured by FUJIFILM Corporation, 2% by mass of a concentration of solid contents, an aqueous solution containing 1,2-bis(3,3,4,4,5,5,6,6,6-nonafluorohexyloxycarbonyl) sodium ethanesulfonate; a surfactant)
- 36.7 parts by mass of Denka Poval B-33 (manufactured by Denka Company Limited, 6.84% by mass of a concentration of solid contents, an aqueous solution containing polyvinyl alcohol; a viscosity improver)
- 15.1 parts by mass of pure water (Manufacturing of Heat Storage Member)

The composition 1 for forming the heat storage layer prepared above was applied on the surface of the easy adhesion layer side of the PET substrate (1) with the easy adhesion layer and the pressure-sensitive adhesive layer by a bar coater such that the mass after drying was 143 g/m², and the coating film was dried at 100° C. for 10 minutes to form a heat storage layer 1 having a thickness of 190 μm.

Next, the composition 1 for forming the protective layer was applied on the surface of the heat storage layer 1 on the side opposite to the surface in contact with the easy adhesion layer, and the coating film was dried at 45° C. for 2 minutes to form a protective layer 1 having a thickness of 3 μm.

As a result, a heat storage member 1 in which the pressure-sensitive adhesive layer, the PET substrate (1), the easy adhesion layer, the heat storage layer 1, and the protective layer 1 are stacked in this order was manufactured.

Example 2

A composition 2 for forming the heat storage layer was prepared by adding and mixing 1.5 parts by mass of a side chain alkylbenzene sulfonic acid amine salt (NEOGEN T, manufactured by DKS Co., Ltd.), 0.15 parts by mass of 1,2-bis(3,3,4,4,5,5,6,6,6-nonafluorohexyloxycarbonyl) sodium ethanesulfonate (W-AHE, manufactured by FUJIFILM Corporation), 0.15 parts by mass of polyoxyalkylene alkyl ether (Noigen LP-90, manufactured by DKS Co., Ltd.), and Taien N (manufactured by Taihei Chemical Industrial Co., Ltd., aqueous dispersion liquid containing diammonium hydrogen phosphate and ammonium dihydrogen phosphate at a concentration of solid contents of 20% by mass; a flame retardant) to 1000 parts by mass of the microcapsule dispersion liquid prepared according to the method described in (Preparation of Composition for Forming Heat Storage Layer) of Example 1. The usage amount of Taien N was adjusted such that the content of Taien N to the content of the total solid content of the composition 2 for forming the heat storage layer was 1.0% by mass.

A heat storage member 2 in which the pressure-sensitive adhesive layer, the PET substrate (1), the easy adhesion layer, and the heat storage layer 2 are stacked in this order was manufactured according to the method described in (Manufacturing of Heat Storage Member) of Example 1 except that a heat storage layer 2 was formed by using the composition 2 for forming the heat storage layer instead of the composition 1 for forming the heat storage layer and the protective layer 1 was not formed.

Example 3

A composition 2 for forming the protective layer was prepared according to the method described in (Preparation of Composition 1 for Forming Protective Layer) of Example 1 except that an aqueous dispersion liquid containing TMP (manufactured by Daihachi Chemical Industry Co., Ltd, trimethyl phosphate; a flame retardant) at a concentration of solid contents of 20% by mass was used instead of Taien N used in Example 1.

A heat storage member 3 in which the pressure-sensitive adhesive layer, the PET substrate (1), the easy adhesion layer, the heat storage layer 1, and a protective layer 2 are stacked in this order was manufactured according to the method described in Example 1 except that the composition 2 for forming the protective layer obtained as above was used instead of the composition 1 for forming the protective layer.

Example 4

A composition 3 for forming the heat storage layer was prepared according to the method described in Example 2 except that an emulsified liquid D3 was prepared by using an aqueous dispersion liquid containing TMP (manufactured by Daihachi Chemical Industry Co., Ltd, trimethyl phosphate; a flame retardant) at a concentration of solid contents of 20% by mass was used instead of Taien N used for preparing an emulsified liquid D2 in Example 2, and the emulsified liquid D3 was used instead of the emulsified liquid D2.

Next, a heat storage member 4 in which the pressure-sensitive adhesive layer, the PET substrate (1), the easy adhesion layer, and a heat storage layer 3 are stacked in this order was manufactured according to the method described in Example 2 except that the heat storage layer 3 is formed by using the composition 3 for forming the heat storage layer instead of the composition 2 for forming the heat storage layer.

Example 5

A composition 3 for forming the protective layer was prepared according to the method described in (Preparation of Composition 1 for Forming Protective Layer) of Example 1 except that 26.0 parts by mass of pure water was used instead of using Epocros WS-700 used in Example 1 for preparing the composition 1 for forming the protective layer.

A heat storage member 5 in which the pressure-sensitive adhesive layer, the PET substrate (1), the easy adhesion layer, the heat storage layer 1, and a protective layer 3 are stacked in this order was manufactured according to the method described in Example 1 except that the composition 3 for forming the protective layer obtained as above was used instead of the composition 1 for forming the protective layer.

Example 6

A composition 4 for forming the protective layer was prepared according to the method described in (Preparation of Composition 1 for Forming Protective Layer) of Example 1 except that 51.8 parts by mass of pure water was used instead of using Denka Poval B-33 used in Example 1 for preparing the composition 1 for forming the protective layer.

A heat storage member 6 in which the pressure-sensitive adhesive layer, the PET substrate (1), the easy adhesion layer, the heat storage layer 1, and a protective layer 4 are stacked in this order was manufactured according to the method described in Example 1 except that the composition 4 for forming the protective layer obtained as above was used instead of the composition 1 for forming the protective layer.

Example 7

The solution C1 prepared according to the method described in (Preparation of Composition for Forming Heat Storage Layer) of Example 1 was added to a solution obtained by dissolving 33.0 parts by mass of polyvinyl alcohol (Kuraray Poval (registered trademark) KL-318 (manufactured by Kuraray Co., Ltd.; polyvinyl alcohol (PVA); an emulsifier) in 627 parts by mass of water, and the mixture was emulsified and dispersed to obtain the emulsified liquid D3. A composition 4 for forming the heat storage layer containing the microcapsule which includes the capsule wall of polyurethane urea and encompasses icosane was prepared according to the method described in (Preparation of Composition for Forming Heat Storage Layer) of Example 1 except that the emulsified liquid D3 was used instead of the emulsified liquid D1.

A heat storage member 7 in which the pressure-sensitive adhesive layer, the PET substrate (1), the easy adhesion layer, the heat storage layer 4, and the protective layer 1 are stacked in this order was manufactured according to the method described in (Manufacturing of Heat Storage Member) of Example 1 except that a heat storage layer 4 was formed by using the composition 4 for forming the heat storage layer instead of the composition 1 for forming the heat storage layer.

Comparative Example 1

A heat storage member C1 in which the pressure-sensitive adhesive layer, the PET substrate (1), the easy adhesion layer, and the heat storage layer 1 are stacked in this order was manufactured according to the method described in (Manufacturing of Heat Storage Member) of Example 1 except that the protective layer 1 was not formed.

Comparative Example 2

A composition 5 for forming the heat storage layer was prepared according to the preparing method of the composition 2 for forming the heat storage layer described in Example 2 except that Taien K (manufactured by Taihei Chemical Industrial Co., Ltd., a concentration of solid contents of 20% by mass, aqueous dispersion liquid containing diammonium polyphosphate; a flame retardant) was used instead of Taien N used for preparing the composition 2 for forming the heat storage layer in Example 2.

A heat storage member C2 in which the pressure-sensitive adhesive layer, the PET substrate (1), the easy adhesion layer, and a heat storage layer 5 are stacked in this order was manufactured according to the method described in Example 2 except that the heat storage layer 5 was formed by using the composition 5 for forming the heat storage layer instead of the composition 2 for forming the heat storage layer.

Comparative Example 3

A composition 5 for forming the protective layer was prepared according to the method described in (Preparation of Composition 1 for Forming Protective Layer) of Example 1 except that PX200 (manufactured by Taihei Chemical Industrial Co., Ltd., a concentration of solid contents of 20% by mass, aqueous dispersion liquid containing 1,3-phenylene-bis(dixylenyl phosphate); a flame retardant) was used instead of Taien N used in Example 1.

A heat storage member C3 in which the pressure-sensitive adhesive layer, the PET substrate (1), the easy adhesion layer, the heat storage layer 1, and a protective layer 5 are stacked in this order was manufactured according to the method described in Example 1 except that the composition 5 for forming the protective layer obtained as above was used instead of the composition 1 for forming the protective layer.

Comparative Example 4

A composition 6 for forming the heat storage layer was prepared according to the preparing method of the composition 2 for forming the heat storage layer described in Example 2 except that PX200 (manufactured by Taihei Chemical Industrial Co., Ltd., a concentration of solid contents of 20% by mass, aqueous dispersion liquid containing 1,3-phenylene-bis(dixylenyl phosphate); a flame retardant) was used instead of Taien N used for preparing the composition 2 for forming the heat storage layer in Example 2.

A heat storage member C4 in which the pressure-sensitive adhesive layer, the PET substrate (1), the easy adhesion layer, and a heat storage layer 6 are stacked in this order was manufactured according to the method described in Example 2 except that the heat storage layer 6 was formed by using the composition 6 for forming the heat storage layer instead of the composition 2 for forming the heat storage layer.

[Evaluation]

The following evaluations were carried out for each of the heat storage members manufactured in Examples 1 to 7 and Comparative Examples 1 to 4. The results of evaluation are shown in Tables 1 and 2, which will be described below.

[Satisfaction Determination of Specific Condition]

(Measurement of Gas Generation Temperature Tr of Flame Retardant (Measuring Method C1))

The gas generation temperature Tr of each flame retardant contained in each heat storage member was measured according to Measuring Method C1.

First, the type and content of the flame retardant contained in the heat storage member were measured by the method described above. The contents of the flame retardant and the heat storage material in the heat storage member are shown in Table 1 described below.

The weight change of the flame retardant contained in the heat storage member due to heating was measured by using the TG-DTA under a nitrogen atmosphere and a temperature rising condition of 10° C. per minute. The relational expression (Expression (C1)) between the temperature T (° C.) and the weight reduction ratio $\Delta ma(T)$ of the flame retardant was derived based on the measurement result, and the temperature at which the weight reduction ratio $\Delta ma(T)$ reached 2% by mass was obtained as the gas generation temperature Tr.

As a result, the gas generation temperatures Tr of Taien N, TMP, Taien K, and PX-200 used in each Example and each Comparative Example were 150° C., 45° C., 280° C., and 326° C., respectively.

(Measurement of Gas Generation Temperature Tc of Specific Member (Measuring Method C2))

The gas generation temperature Tr of the specific member obtained by removing the flame retardant and the specific solvent from the heat storage member was measured according to Measuring Method C2.

The weight change of the heat storage member in each Example and each Comparative Example due to heating was measured by using the TG-DTA under a nitrogen atmosphere and a temperature rising condition of 10° C. per minute. The relational expression (Expression (C2)) between the temperature T (° C.) and the weight reduction ratio $\Delta m3(T)$ of the heat storage member was derived based on the measurement result.

As a result of the measurement of each component contained in the heat storage member described above, no specific solvent was detected in the heat storage member of each Example and each Comparative Example.

From the relational expression between the temperature T (° C.) and the weight reduction ratio $\Delta m3(T)$ of the heat storage member and the relational expression between the temperature T (° C.) and the weight reduction ratio $\Delta ma(T)$ of the flame retardant, the relational expression between the temperature T (° C.) and the weight reduction ratio $\Delta mz(T)$ of the specific member was derived, and the temperature at which the weight reduction ratio $\Delta mz(T)$ reached 2% by mass was obtained as the gas generation temperature Tc of the specific member.

As a result, in all of the heat storage members of Examples, the gas generation temperature Tr of the flame retardant was lower than the gas generation temperature Tc of the specific member (Tc−Tr>0), and Condition C was satisfied.

On the other hand, in all of the heat storage members of Comparative Examples 1 to 3 in which the flame retardant was used, the gas generation temperature Tr of the flame retardant was higher than the gas generation temperature Tc of the specific member (Tc−Tr<0), and Condition C was satisfied.

[Evaluation of Slow Flame Retardance]

(Ignitability)

A sample having a size of 12.5 cm in length and 1.3 cm in width was cut out from each heat storage member, and the sample and an aluminum plate having a thickness of 0.2 mm were attached such that the pressure-sensitive adhesive layer of the sample was in contact with the aluminum plate to produce three samples with the aluminum plates. According to the method of UL94HB standard (Underwriters Laboratories Inc.), the heat storage member side of each sample with the aluminum plate was in contact with flame, and the presence or absence of ignition was confirmed. From the number of ignited samples among the three samples with the aluminum plates, the ignitability of the heat storage member was evaluated based on the following criteria.

4: None of three samples with aluminum plates ignited.

3: One sample with aluminum plate ignited.

2: Two samples with aluminum plates ignited.

1: Three samples with aluminum plates ignited.

(Slow Flame Retardance)

Three samples of each heat storage member with the aluminum plate were prepared according to the method described in the evaluation of ignitability described above. Each sample was marked with two marked lines spaced by 75 mm. According to the method of UL94HB standard (Underwriters Laboratories Inc.), the heat storage member was ignited by contact flame from the aluminum plate side of each sample with the aluminum plate. The speed (combustion speed) of the flame which moves between the two marked lines marked to each sample was measured, and from an average value of the obtained combustion speed, the slow flame retardance of each sample was evaluated based on the following criteria according to the UL94HB standard.

2: Combustion speed is less than 75 mm/min, or extinguishing flame before reaching the second marked line.

1: Combustion speed is 75 mm/min or more.

[Appearance Evaluation Before and After Storage Test]

Each heat storage member was stored for 250 hours in an environment of a temperature of 90° C. and a humidity of 10 RH % or less. A change in appearance before and after the storage test was visually observed, and the evaluation was performed from the observation result based on the following criteria.

2: Changes in color and/or surface reflection of the heat storage member were observed as compared to before storage.

1: No change in appearance was observed.

[Measurement of Latent Heat Capacity]

The latent heat capacity (unit: J/g) per mass of the obtained heat storage member was calculated from the result of the differential scanning calorimetry (DSC) and the thickness of the heat storage layer.

[Other Evaluations]
(Evaluation of Crosslinking Structure)

For Each of the heat storage members of Examples 1, 3 and 5 to 7 and Comparative Example 1, the crosslinking structure of the protective layer was evaluated by the following method.

A sample having a size of 2 cm square was cut out from each heat storage member, and the sample was immersed in 50 ml of water. The sample was extracted after being stirred with a stirrer for 10 minutes. The water solubility of the protective layer was evaluated based on the following criteria by visually confirming whether or not the protective layer remains on the surface of the extracted sample.

3: The protective layer remains.
2: A small amount of the protective layer remains.
1: The protective layer does not remain.

The test was carried out according to the above method except that 50 ml of N,N-dimethylformamide was used instead of water, and the solvent solubility of the protective layer was evaluated based on the following criteria.

3: The protective layer remains.
2: A small amount of the protective layer remains
1: The protective layer does not remain.

As a result of the evaluation, in all of the protective layers included in the heat storage members, the both evaluations for water solubility and solvent solubility were "3", it was evaluated that the protective layer of each heat storage member has a structure insoluble in either water or solvent, that is, the crosslinking structure.

(Evaluation of Fissuring)

The surface of the protective layer disposed on the outermost layer of each heat storage member manufactured in each Examples 1, 3, and 5 to 7 and Comparative Example 1 was observed at a magnification of 200 times by using SEM. From the state of fissuring on the surface of the protective layer, the fissuring on the surface of the protective layer was evaluated based on the following criteria.

3: No fissuring is present on the surface of the protective layer.
2: A small amount of fissuring is present on the surface of the protective layer.
1: A large amount of fissuring is present on the surface of the protective layer.

As a result of the evaluation described above, in all of the protective layers of the heat storage members, it was evaluated that the evaluation for fissuring on the surface of the protective layer is "3".

TABLE 1

|  |  | Example 1 | Example 2 | Example 3 | Example 4 | Example 5 | Example 6 | Example 7 |
|---|---|---|---|---|---|---|---|---|
| Heat storage layer | Number | 1 | 2 | 1 | 3 | 1 | 1 | 4 |
|  | Content (%) of heat storage material | 84% | 84% | 84% | 84% | 84% | 84% | 64% |
|  | Flame retardant | Absence | Taien N | Absence | TMP | Absence | Absence | Absence |
|  | Content (%) of flame retardant | — | 1.0 | — | 1.0 | — | — | — |
| Protective layer | Number or presence or absence | 1 | Absence | 2 | Absence | 3 | 4 | 1 |
|  | Flame retardant | Taien N | — | TMP | — | Taien N | Taien N | Taien N |
|  | Content (%) of flame retardant | 0.11% | — | 0.11% | — | 0.14% | 0.13% | 0.11% |
|  | Viscosity adjuster | Denka Poval B-33 | — | Denka Poval B-33 | — | Denka Poval B-33 | — | Denka Poval B-33 |
|  | Curing agent | WS-700 | — | WS-700 | — | — | WS-700 | WS-700 |
|  | Ratio (Flame retardant/Heat storage material) | 0.1% | 1.0% | 0.1% | 1.0% | 0.2% | 0.2% | 0.2% |
| Condition determination | Gas generation temperature Tr (° C.) of Flame retardant | 150 | 150 | 45 | 45 | 150 | 150 | 150 |
|  | Gas generation temperature Tr (° C.) of specific member | 169 | 169 | 169 | 169 | 169 | 169 | 169 |
|  | Tc − Tr | 19 | 19 | 124 | 124 | 19 | 19 | 19 |
| Evaluation | Flame Retardance (Ignitability) | 4 | 4 | 4 | 4 | 3 | 3 | 4 |
|  | Flame Retardance (Slow Flame Retardance) | 2 | 2 | 2 | 2 | 2 | 2 | 2 |
|  | Change in appearance before and after storage test | Absence | Presence | Presence | Presence | Absence | Presence | Presence |
|  | Heat absorption amount (J/g) | 191 | 187 | 191 | 187 | 191 | 191 | 147 |

TABLE 2

|  |  | Comparative Example 1 | Comparative Example 2 | Comparative Example 3 | Comparative Example 4 |
|---|---|---|---|---|---|
| Heat storage layer | Number | 1 | 5 | 1 | 6 |
|  | Content (%) of heat storage material | 85% | 84% | 84% | 84% |
|  | Flame retardant | Absence | Taien K | Absence | PX-200 |
|  | Content (%) of flame retardant | — | 1.0 | — | 1.0 |
| Protective layer | Number or presence or absence | Absence | Absence | 6 | Absence |
|  | Flame retardant | — | — | PX-200 | — |
|  | Content (%) of flame retardant | — | — | 0.11% | — |
|  | Viscosity adjuster | — | — | Denka Poval B-33 | — |
|  | Curing agent | — | — | WS-700 | — |
|  | Ratio (Flame retardant/Heat storage material) | 0.0% | 1.0% | 0.1% | 1.0% |
| Condition determination | Gas generation temperature Tr (° C.) of Flame retardant | — | 280 | 326 | 326 |
|  | Gas generation temperature Tr (° C.) of specific member | 169 | 169 | 169 | 169 |
|  | Tc − Tr | — | −111 | −157 | −157 |

TABLE 2-continued

|  |  | Comparative Example 1 | Comparative Example 2 | Comparative Example 3 | Comparative Example 4 |
|---|---|---|---|---|---|
| Evaluation | Flame Retardance (Ignitability) | 1 | 1 | 1 | 1 |
|  | Flame Retardance (Slow Flame Retardance) | 1 | 1 | 1 | 1 |
|  | Change in appearance before and after storage test | Presence | Presence | Absence | Presence |
|  | Heat absorption amount (J/g) | 197 | 187 | 191 | 187 |

From the results shown in Tables 1 and 2, it was confirmed that all of the heat storage members according to the embodiment of the present invention, which satisfy Condition C were excellent in the slow flame retardance and excellent in the ignition resistance.

All of the heat storage members of Examples 1 to 7 manufactured in this example are one aspect of the heat storage composition according to the embodiment of the present invention, which satisfies Condition A, and as described above, it was confirmed that the heat storage members were excellent in the slow flame retardance and excellent in the ignition resistance.

Further, from the comparison between Examples 1 to 6 and Example 7, it can be seen that in a case in which the content of the heat storage material to the total mass of the heat storage composition is 65% by mass or more, the heat absorption amount and the flame retardance are more excellent.

Further, from the comparison between Examples 1 and 3 and Example 5, it can be seen that the protective layer containing the curing agent is more excellent in the ignition resistance.

Further, from the comparison between Examples 1 and 3 and Example 6, it can be seen that the protective layer containing the viscosity adjuster is more excellent in the ignition resistance.

Further, from the comparison between Examples 1 and 2 and Examples 3 and 4, it can be seen that in a case in which the flame retardant is contained in the protective layer, the heat absorption amount and flame retardance are more excellent.

The heat storage composition, the heat storage sheet, and the heat storage member according to the embodiments of the present invention can suitably be used, for example, as heat storage and heat dissipation materials for stable operation by maintaining the surface temperature of a heat generating unit in the electronic device in any temperature range. Also, it can be suitably used in applications such as building materials (for example, flooring materials, roofing materials, wall materials, and the like) which are suitable for temperature control to rapid temperature rise during the day or during indoor heating and cooling; clothing (for example, underwear, outerwear, winter clothes, gloves, and the like) which is suitable for temperature control depending on the changes in environmental temperature or changes in body temperature during exercise or rest; bedding; and an exhaust heat utilization system which stores unnecessary exhaust heat and uses it as thermal energy.

What is claimed is:
1. A heat storage composition comprising:
a heat storage material; and
a flame retardant,
wherein Condition A is satisfied,
Condition A: a gas generation temperature Tr of the flame retardant obtained by Measuring Method A1 is lower than a gas generation temperature Ta of a specific composition obtained by Measuring Method A2,

Measuring Method A1: a type and a content of the flame retardant contained in the heat storage composition are identified, a weight change of the flame retardant due to heating is measured by using a thermogravimeter-differential thermal analyzer, and a relational expression, which is represented by Expression (A1), between a temperature T (° C.) and a weight reduction ratio $\Delta ma(T)$ of the flame retardant is derived based on a measurement result, $$\Delta ma(T)=(ma_0-ma(T))/(ma_0) \quad (A1)$$

in Expression (A1), ma(T) represents a weight of the flame retardant at the temperature T (° C.) and $ma_0$ represents a weight of the flame retardant before heating, a temperature at which the weight reduction ratio $\Delta ma(T)$ of the flame retardant reaches 2% by mass is obtained by using Expression (A1), and the obtained temperature is defined as the gas generation temperature Tr (° C.) of the flame retardant, Measuring Method A2: a weight change of the heat storage composition due to heating is measured by using the thermogravimeter-differential thermal analyzer, and a relational expression, which is represented by Expression (A2), between the temperature T (° C.) and a weight reduction ratio $\Delta m1(T)$ of the heat storage composition is derived based on a measurement result, $$\Delta m1(T)=(m1_0-m1(T))/(m1_0) \quad (A2)$$

in Expression (A2), m1(T) represents a weight of the heat storage composition at the temperature T (° C.) and $m1_0$ represents a weight of the heat storage composition before heating, further, a type and a content of a solvent, which is contained in the heat storage composition and has a boiling point of 100° C. or lower, are identified; as a result of measurement, in a case in which the heat storage composition contains the solvent, a weight change of the solvent due to heating is measured by using the thermogravimeter-differential thermal analyzer, and a relational expression, which is represented by Expression (A3), between the temperature T (° C.) and a weight reduction ratio $\Delta mb(T)$ of the solvent is derived based on a measurement result, $$\Delta mb(T)=(mb_0-mb(T))/(mb_0) \quad (A3)$$

in Expression (A3), mb(T) represents a weight of the solvent at the temperature T (° C.) and $mb_0$ represents a weight of the solvent before heating, a relational expression, which is represented by Expression (A4), between the temperature T (° C.) and a weight reduction ratio $\Delta mx(T)$ of the specific composition obtained by removing the flame retardant and the solvent from the heat storage composition is derived, $$\Delta mx(T)=(100*\Delta m1(T)-a*\Delta ma(T)-b*\Delta mb(T))/(100-a-b) \quad (A4)$$

in Expression (A4), a represents a ratio (% by mass) of the content of the flame retardant to a total mass of the heat storage composition, b represents a ratio (% by mass) of the content of the solvent to the total mass of the heat storage composition, and Δma(T) represents the weight reduction ratio of the flame retardant obtained by Measuring Method A1, a temperature at which the weight reduction ratio Δmx(T) of the specific composition reaches 2% by mass is obtained by using Expression (A4), and the obtained temperature is defined as the gas generation temperature Ta (° C.) of the specific composition.

2. The heat storage composition according to claim 1, wherein the heat storage material contains paraffin.

3. The heat storage composition according to claim 1, wherein a content of the heat storage material to the total mass of the heat storage composition is 70% by mass or more.

4. The heat storage composition according to claim 1, wherein the content of the flame retardant to a content of the heat storage material is 0.1% by mass or more.

5. The heat storage composition according to claim 1, wherein the flame retardant contains at least one selected from the group consisting of diammonium hydrogen phosphate, ammonium dihydrogen phosphate, and trimethyl phosphate.

6. The heat storage composition according to claim 1, wherein the flame retardant contains at least one selected from the group consisting of diammonium hydrogen phosphate and ammonium dihydrogen phosphate.

7. The heat storage composition according to claim 1, wherein the gas generation temperature Tr of the flame retardant is 100° C. or higher.

8. The heat storage composition according to claim 1, wherein the heat storage composition is sheet-shaped.

9. A heat storage member comprising:
a heat storage material; and
a flame retardant,
wherein Condition C is satisfied,
  Condition C: a gas generation temperature Tr of the flame retardant obtained by Measuring Method C1 is lower than a gas generation temperature Tc of a specific member obtained by Measuring Method C2,
  Measuring Method C1: a type and a content of the flame retardant contained in the heat storage member are identified, a weight change of the flame retardant due to heating is measured by using a thermogravimeter-differential thermal analyzer, and a relational expression, which is represented by Expression (C1), between a temperature T (° C.) and a weight reduction ratio Δma(T) of the flame retardant is derived based on a measurement result, $$\Delta ma(T)=(ma_0-ma(T))/(ma_0) \tag{C1}$$

in Expression (C1), ma(T) represents a weight of the flame retardant at the temperature T (° C.) and $ma_0$ represents a weight of the flame retardant before heating, a temperature at which the weight reduction ratio Δma(T) of the flame retardant reaches 2% by mass is obtained by using Expression (C1), and the obtained temperature is defined as the gas generation temperature Tr (° C.) of the flame retardant, Measuring Method C2: a weight change of the heat storage member due to heating is measured by using the thermogravimeter-differential thermal analyzer, and a relational expression, which is represented by Expression (C2), between the temperature T (° C.) and a weight reduction ratio Δm3(T) of the heat storage member is derived based on a measurement result, $$\Delta m3(T)=(m3_0-m3(T))/(m3_0) \tag{C2}$$

in Expression (C2), m3(T) represents a weight of the heat storage member at the temperature T (° C.) and $m3_0$ represents a weight of the heat storage member before heating, further, a type and a content of a solvent, which is contained in the heat storage member and has a boiling point of 100° C. or lower, are identified; as a result of measurement, in a case in which the heat storage member contains the solvent, a weight change of the solvent due to heating is measured by using the thermogravimeter-differential thermal analyzer, and a relational expression, which is represented by Expression (C3), between the temperature T (° C.) and a weight reduction ratio Δmb(T) of the solvent is derived based on a measurement result, $$\Delta mb(T)=(mb_0-mb(T))/(mb_0) \tag{C3}$$

in Expression (C3), mb(T) represents a weight of the solvent at the temperature T (° C.) and $mb_0$ represents a weight of the solvent before heating, a relational expression, which is represented by Expression (C4), between the temperature T (° C.) and a weight reduction ratio Δmz(T) of the specific member obtained by removing the flame retardant and the solvent from the heat storage member is derived, $$\Delta mz(T)=(100*\Delta m3(T)-a*\Delta ma(T)-b*\Delta mb(T))/(100-a-b) \tag{C4}$$

in Expression (C4), a represents a ratio (% by mass) of the content of the flame retardant to a total mass of the heat storage member, b represents a ratio (% by mass) of the content of the solvent to the total mass of the heat storage member, and Δma(T) represents the weight reduction ratio of the flame retardant obtained by Measuring Method C1, a temperature at which the weight reduction ratio Δmz(T) of the specific member reaches 2% by mass is obtained by using Expression (C4), and the obtained temperature is defined as the gas generation temperature Tc (° C.) of the specific member.

10. The heat storage member according to claim 9, wherein the heat storage member has a heat storage layer, which includes the heat storage material, and a protective layer, and
at least one of the heat storage layer or the protective layer contains the flame retardant.

11. The heat storage member according to claim 9, wherein the heat storage material contains paraffin.

12. The heat storage member according to claim 9, wherein a content of the heat storage material to the total mass of the heat storage member is 70% by mass or more.

13. The heat storage member according to claim 9, wherein the content of the flame retardant to a content of the heat storage material is 0.1% by mass or more.

14. The heat storage member according to claim 9, wherein the flame retardant contains at least one selected from the group consisting of diammonium hydrogen phosphate, ammonium dihydrogen phosphate, and trimethyl phosphate.

15. The heat storage member according to claim 9, wherein the flame retardant contains at least one selected from the group consisting of diammonium hydrogen phosphate and ammonium dihydrogen phosphate.

16. The heat storage member according to claim 9, wherein the gas generation temperature Tr of the flame retardant is 100° C. or higher.

17. The heat storage member according to claim 10, wherein the protective layer contains the flame retardant.

18. The heat storage member according to claim 10, wherein the protective layer has a crosslinking structure.

19. The heat storage member according to claim 10, wherein the protective layer has a thickness of 10 μm or less.

20. An electronic device comprising the heat storage composition according to claim 1.

21. A manufacturing method of the heat storage member according to claim 10, the method comprising:
disposing the protective layer on at least one surface of the heat storage layer.

* * * * *